United States Patent

Farris et al.

[11] Patent Number: 6,125,113
[45] Date of Patent: Sep. 26, 2000

[54] INTERNET TELEPHONE SERVICE

[75] Inventors: Robert D. Farris, Sterling; Dale L. Bartholomew, Vienna, both of Va.; Stephen J. Flaherty, Upper Marlboro, Md.

[73] Assignee: Bell Atlantic Network Services, Inc., Arlington, Va.

[21] Appl. No.: 08/698,713

[22] Filed: Aug. 16, 1996

Related U.S. Application Data

[63] Continuation-in-part of application No. 08/634,543, Apr. 18, 1996.

[51] Int. Cl.[7] .......................... H04L 12/66; H04L 12/28; H04J 1/00; H04M 1/64

[52] U.S. Cl. .......................... 370/389; 370/352; 370/401; 370/427; 370/485; 379/88.17; 379/93.01

[58] Field of Search .................................. 370/352, 353, 370/380, 389, 392, 396, 401, 404, 427, 435, 450, 465, 485; 379/88.17, 90.01, 93.01, 93.05, 93.09, 100.15, 100.16

[56] References Cited

U.S. PATENT DOCUMENTS

| | | | |
|---|---|---|---|
| 4,310,727 | 1/1982 | Lawser | 379/207 |
| 4,371,752 | 2/1983 | Matthews et al. | 379/89 |
| 4,585,906 | 4/1986 | Matthews et al. | 379/88 |
| 4,602,129 | 7/1986 | Matthews et al. | 379/88 |
| 4,609,778 | 9/1986 | Franklin et al. | 379/246 |
| 4,625,081 | 11/1986 | Lotito et al. | 379/88 |
| 4,652,700 | 3/1987 | Matthews et al. | 379/89 |
| 4,672,700 | 6/1987 | Poncy | 5/654 |
| 4,766,604 | 8/1988 | Axberg | 379/67 |
| 4,790,003 | 12/1988 | Kepley | 379/88 |
| 4,872,160 | 10/1989 | Hemmady et al. | 370/353 |
| 4,918,722 | 4/1990 | Duehran et al. | 379/100.11 |
| 4,922,348 | 5/1990 | Gillon et al. | 358/407 |
| 4,958,341 | 9/1990 | Hemmady et al. | 370/352 |
| 4,969,184 | 11/1990 | Gordon et al. | 379/100.13 |
| 5,008,906 | 4/1991 | Reichwein | 378/54 |
| 5,008,926 | 4/1991 | Misholi | 379/89 |
| 5,012,511 | 4/1991 | Hanle et al. | 379/211 |
| 5,018,191 | 5/1991 | Catron et al. | 379/100.19 |
| 5,029,199 | 7/1991 | Jones et al. | 379/89 |
| 5,029,200 | 7/1991 | Haas | 379/89 |
| 5,034,975 | 7/1991 | Grimes | 379/67 |
| 5,134,647 | 7/1992 | Pugh et al. | 379/88 |
| 5,163,080 | 11/1992 | Amoroso | 379/33 |
| 5,193,110 | 3/1993 | Jones et al. | 379/93.14 |
| 5,195,128 | 3/1993 | Knitl | 379/67 |
| 5,199,062 | 3/1993 | Von Meister | 379/67 |
| 5,200,993 | 4/1993 | Wheeler et al. | 379/93.02 |

(List continued on next page.)

*Primary Examiner*—Krista Zele
*Assistant Examiner*—Allan Hoosain
*Attorney, Agent, or Firm*—McDermott, Will & Emery

[57] ABSTRACT

A public switched telephone network utilizing program controlled switching systems controlled by common channel interoffice signaling (CCIS) and preferably an advanced intelligent network (AIN) CCIS network is arranged in an architecture to provide a methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Billing may be accomplished on a per call basis. The calls may be inter and intra LATA, region or state and may be nationwide. Usage is made of CCIS signaling to set up the call and establish the necessary Internet connections and addressing. Calls may be made from telephone station to telephone station, from voice capable computer to voice capable computer, or from telephone to computer or computer to telephone. Provision is made to permit such Internet connection via wireless telephone stations.

14 Claims, 14 Drawing Sheets

U.S. PATENT DOCUMENTS

| | | | |
|---|---|---|---|
| 5,237,604 | 8/1993 | Ryan | 379/220 |
| 5,247,571 | 9/1993 | Kay et al. | 379/207 |
| 5,263,080 | 11/1993 | Jones et al. | 379/88 |
| 5,274,696 | 12/1993 | Perelman | 379/89 |
| 5,289,468 | 2/1994 | Yoshida | 370/401 |
| 5,309,437 | 5/1994 | Perlman | 370/401 |
| 5,327,486 | 7/1994 | Wolff et al. | 379/96 |
| 5,333,266 | 7/1994 | Boaz | 395/200.36 |
| 5,341,374 | 8/1994 | Lewen et al. | 370/450 |
| 5,353,331 | 10/1994 | Emery et al. | 455/461 |
| 5,367,566 | 11/1994 | Moe et al. | 379/243 |
| 5,375,068 | 12/1994 | Palmer et al. | 395/200.34 |
| 5,375,159 | 12/1994 | Williams | 379/23 |
| 5,377,186 | 12/1994 | Wegner et al. | 370/220 |
| 5,381,465 | 1/1995 | Carter et al. | 379/67 |
| 5,386,467 | 1/1995 | Ahmad | 379/220 |
| 5,400,393 | 3/1995 | Knuth | 379/88 |
| 5,410,754 | 4/1995 | Koltzbach et al. | 370/466 |
| 5,416,842 | 5/1995 | Aziz | 380/30 |
| 5,420,916 | 5/1995 | Sekiguchi | 379/230 |
| 5,434,913 | 7/1995 | Tung et al. | 379/202 |
| 5,436,957 | 7/1995 | McConnell | 379/88 |
| 5,442,690 | 8/1995 | Nazif et al. | 379/207 |
| 5,473,677 | 12/1995 | D'Amato et al. | 379/112 |
| 5,475,737 | 12/1995 | Garner et al. | 379/67 |
| 5,490,247 | 2/1996 | Tung et al. | 345/501 |
| 5,493,568 | 2/1996 | Sampat et al. | 370/261 |
| 5,572,583 | 11/1996 | Wheeler, Jr. et al. | 379/207 |
| 5,608,786 | 3/1997 | Gordon | 379/100 |
| 5,610,910 | 3/1997 | Focsaneanu et al. | 370/351 |
| 5,661,790 | 8/1997 | Hsu | 379/209 |
| 5,724,355 | 3/1998 | Bruno et al. | 370/401 |
| 5,724,412 | 3/1998 | Srinivasan | 379/93.23 |
| 5,726,984 | 3/1998 | Kubler et al. | 370/349 |
| 5,742,670 | 4/1998 | Bennett | 379/142 |
| 5,742,905 | 4/1998 | Pepe et al. | 455/461 |
| 5,768,513 | 6/1998 | Kuthyar et al. | 395/200.34 |
| 5,793,763 | 8/1998 | Mayes et al. | 370/389 |
| 5,805,587 | 9/1998 | Norris et al. | 370/352 |

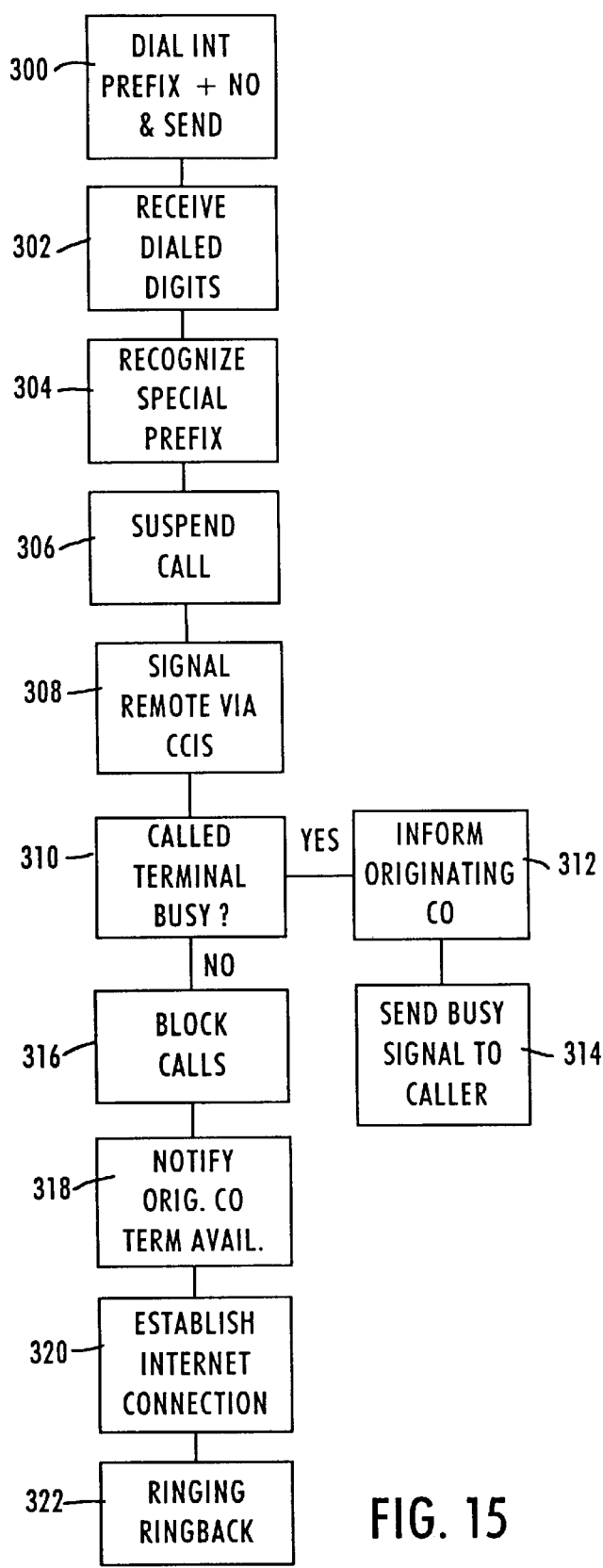
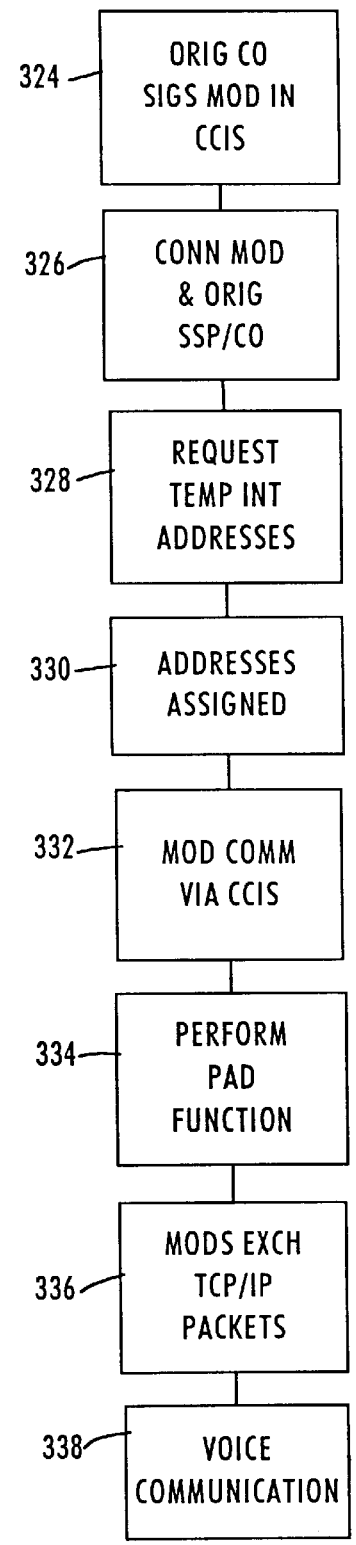
FIG. 15
FIG. 16

INTERNET TELEPHONE SERVICE

RELATED APPLICATIONS

This application is a continuation-in-part of application Ser. No. 08/634,543, Internet Telephone Service, filed Apr. 18, 1996 (Attorney Ref. No. 680-178).

This application is related to application Ser. No. 08/598,767, Analog Terminal Internet Access, filed Feb. 9, 1996 (Attorney Ref. No. 680-085E), which is a continuation-in-part of applications Ser. Nos. 08/353,281, filed Dec. 5, 1994 (Attorney Ref. No. 680-085), 08/371,906, filed Jan. 12, 1995 (Attorney Ref. No. 680-085), 08/539,952, filed Oct. 6, 1995 (Attorney Ref. No. 680-085B), and 08/557,749, filed Nov. 13, 1995 (Attorney Ref. No. 680-085C), and to application Ser. No. 08/634,544, Universal Access Multimedia Data Network, filed Apr. 18, 1996 (Attorney Ref. No. 680-170), which applications are assigned to the assignee of the instant application. The specifications of those applications are incorporated herein by reference in their entirety.

TECHNICAL FIELD

The present invention relates to methods and system structures for providing public and private telephone service over the Internet and more particularly relates to providing such services through the public telecommunications system including over existing copper telephone lines.

BACKGROUND

Attention recently has been directed to implementing voice telephone service over the worldwide network now commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

Referring to FIG. 1 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are representative of computers connected to the Internet via the public switched telephone network (PSTN) are shown connected to the AS/ISPs via dial up links 44 and 46.

The Information Providers (IPs) constitute the end systems which collect and market the information through their own servers. Access providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

DISCLOSURE OF THE INVENTION

Objects of the Invention

It is an object of the present invention to provide telephone service via the Internet to users of the public telecommunications network either with or without access to a computer and with or without separate telephone user access to the Internet.

It is another object of the invention to provide the general public with an economical and convenient telephone service via the Internet without requiring the possession of computing equipment or familiarity with the Internet or its methodology on the part of the user.

It is yet another object of the invention to provide the public with impulse access to the Internet for voice communications without requiring maintenance of a subscription to an Internet access service.

SUMMARY OF THE INVENTION

A public switched telephone network utilizing program controlled switching systems controlled by common channel interoffice signaling (CCIS) and preferably an advanced intelligent network (AIN) CCIS network is arranged in an architecture to provide a methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Billing may be accomplished on a per call basis. The calls may be inter and intra LATA, region or state and may be nationwide. Usage is made of CCIS signaling to set up the call and establish the necessary Internet connections and addressing. Calls may be made from telephone station to telephone station, from voice capable computer to voice capable computer, or from telephone to computer or computer to telephone.

DESCRIPTION OF THE DRAWINGS

FIGS. 15 and 16 illustrate in simplified flow diagrams one mode of operation of the system of FIG. 13.

BEST MODE FOR CARRYING OUT THE INVENTION

Modern Public Switched Telephone Networks (PSTNs) are generally implemented using an Advanced Intelligent Network (AIN) type architecture. One example of such an AIN system in a typical PSTN appears in simplified block diagram form in FIG. 2.

In this example central office switches or COs may be located throughout a state. Local telephone lines connect individual telephone stations in each geographic area to the closest central office. Each central office connects via trunk circuits to one or more of the other COs, and each CO has a Common Channel Interoffice Signaling (CCIS) data link to a Signaling Transfer Point (STP). The trunk circuits carry large numbers of telephone calls between the central offices. CCIS data communication is provided via links to signaling transfer points (STPs).

Figure 2:
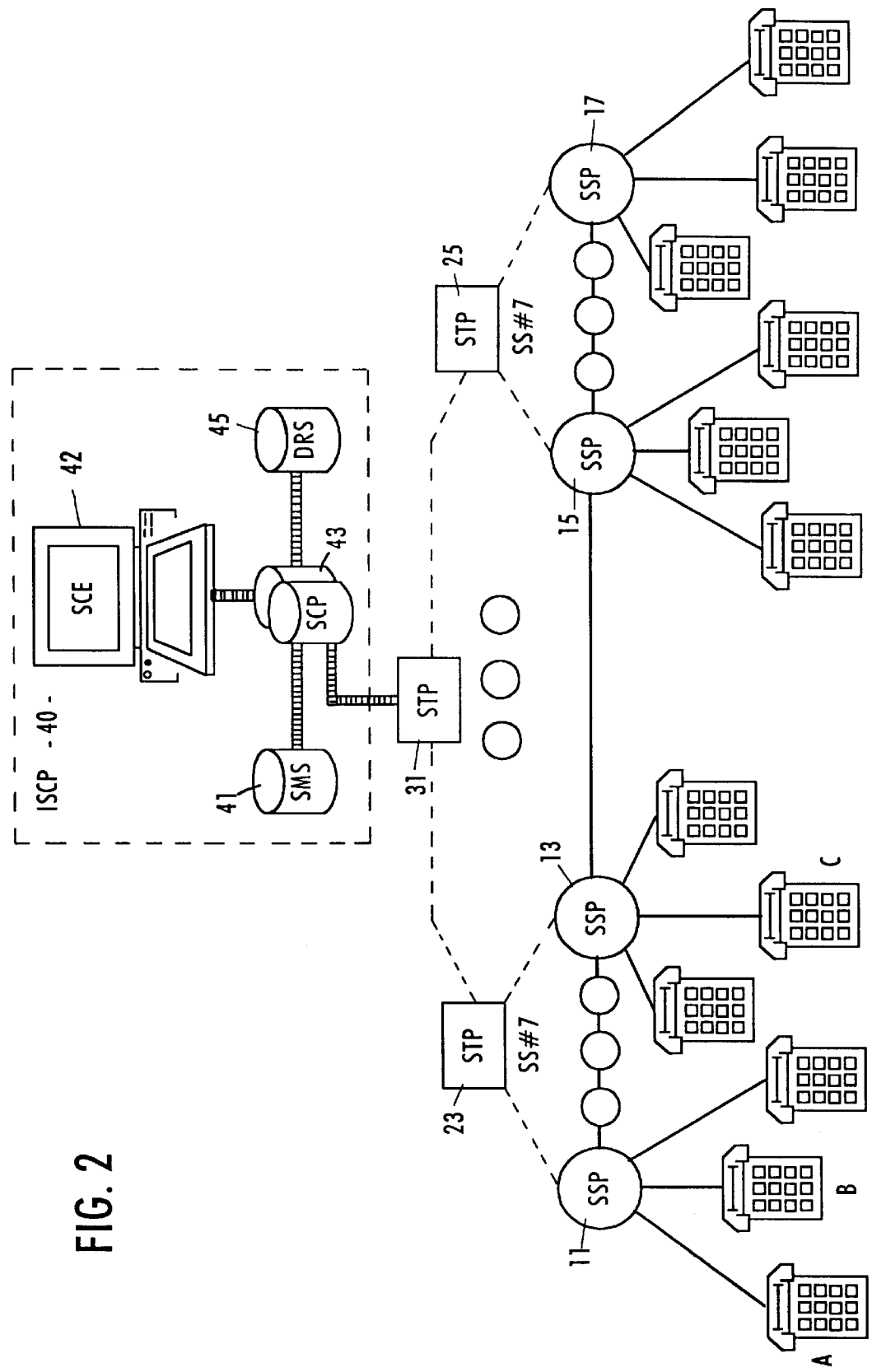
FIG. 2 is a simplified block diagram of a Public Switched Telephone Network (PSTN) having a Common Channel Interoffice Signaling (CCIS) system in the form of an Advanced Intelligent Network (AIN) system.

An AIN PSTN may be implemented with one or more Integrated Service Control Points (ISCPs) per state, as in the FIG. 2 implementation, to avoid overloading existing CCIS data links. Alternatively, the ISCP could be implemented on a LATA by LATA basis or on a regional operating company basis, i.e., one data base for the entire geographic area serviced by one of the Regional Bell Operating Companies. In fact, if federal regulations permitted, the data base service could be nationwide.

Referring to FIG. 2, each of the central offices are labeled as an "SSP." The Service Switching Points, referred to as SSPs, are appropriately equipped programmable switches present in the telephone network, which recognize AIN type calls, launch queries to the ISCP and receive commands and data from the ISCP to further process the AIN calls.

SSPs can be programmed to recognize a number of different triggers as an indication that a call is an AIN call. The trigger can relate to the terminating station or to the identification of the telephone line from which a call or other request for service originates, or to the action to be performed by the SSP. As an example, for providing Area Wide Centrex, a number of lines are designated as members of a business group serviced by the Area Wide Centrex. The SSPs then trigger AIN type servicing based on origination of the call or service request from a line designated as a member of one of the business groups subscribing to Area Wide Centrex. Further explanation of this operation will be found in U.S. Pat. No. 5,247,571, issued Sep. 21, 1993, which is incorporated herein by reference.

As shown in FIG. 2, all of the central offices 11, 13, 15 and 17 are equipped and programmed to serve as SSPs. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSPs. The illustrated embodiment is perhaps an ideal implementation in making each central office an SSP. Other implementations provide the SSP functionality only at selected points in the network, and end offices without such functionality forward calls to one of the SSPs.

The implementation of FIG. 2 includes a number of the SSP capable central office switches, such as the SSPs shown at 11, 13, 15, and 17. The SSP type central offices are each at a different location and distributed throughout the area, region or country served by the system. The SSPs 11 and 13 connect to a first local area STP 23, and the SSPs 15 and 17 connect to a second local area STP 25. The connections to the STPs are for signaling purposes. As indicated by the black dots below STPs 23 and 25, each local area STP can connect to a large number of the SSPs. In FIG. 2 the central offices or SSPs are interconnected to each other by trunk circuits for carrying telephone services.

The local area STPs 23 and 25, and any number of other such local area STPs shown as black dots between STPs 23 and 25, communicate with a state or regional STP 31. The state or regional STP 31 in turn provides communications with the ISCP 40. The STP hierarchy can be expanded or contracted to as many levels as needed to serve any size area covered by the system. The links 23 and 25 between the central offices and the local area STPs are dedicated CCIS links, typically SS7 type interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 2, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two central offices.

Figure 3:
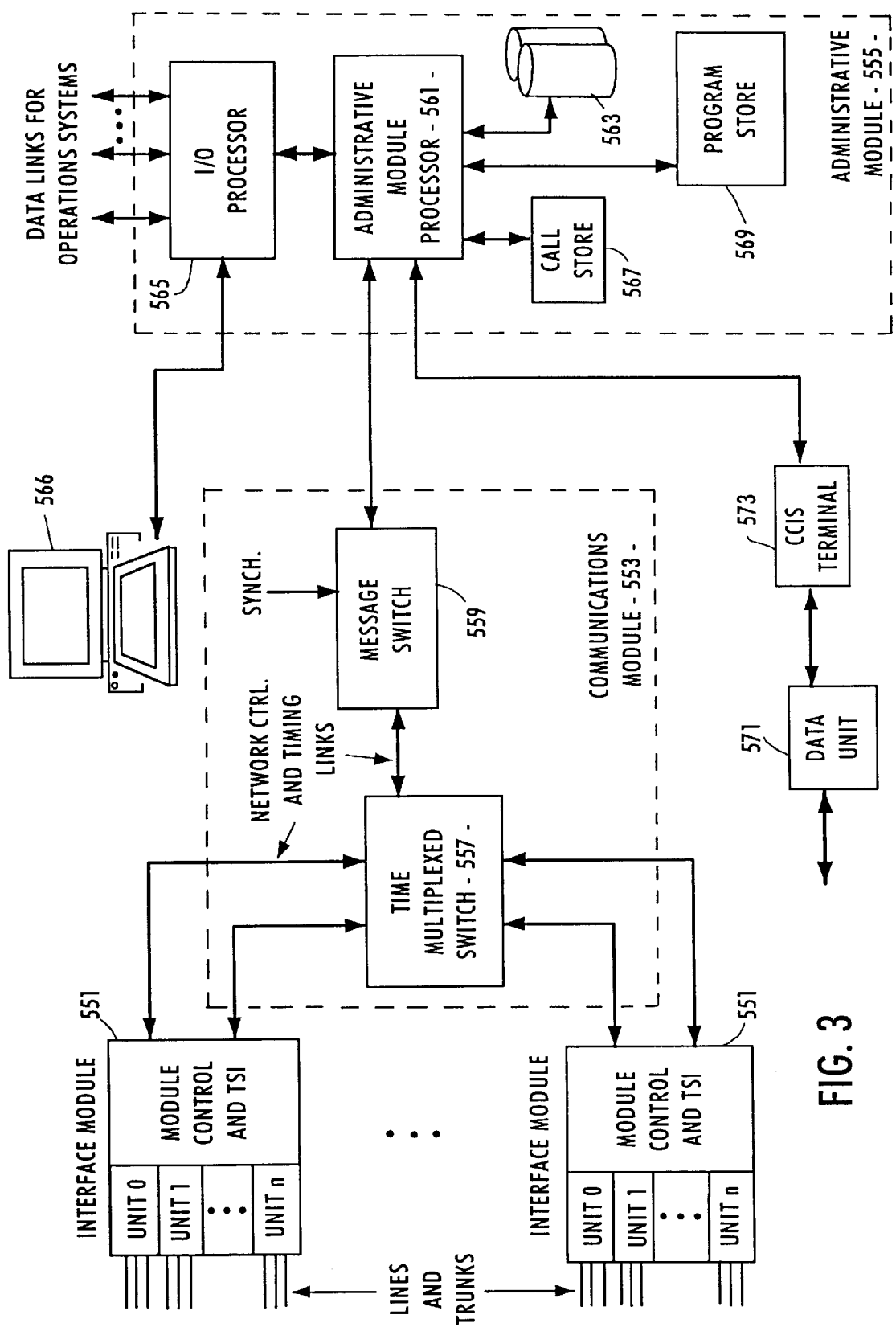
FIG. 3 is a simplified block diagram of an electronic program controlled switch which may be used as any one of the SSP type central offices in the system of FIG. 2.

FIG. 3 is a simplified block diagram of an electronic program controlled switch which may be used as any one of the SSP type central offices in the system of FIG. 2. As illustrated, the central office switch includes a number of different types of modules. In particular, the illustrated switch includes interface modules 551 (only two of which are shown), a communications module 553 and an administrative module 555.

The interface modules 551 each include a number of interface units 0 to n. The interface units terminate lines from subscribers' stations, trunks, TI carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 551 also includes a digital service unit (not shown) which is used to generate call progress tones.

Each interface module 551 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 557 and thence to another interface module (intermodule call connection).

The communication module 553 includes the time multiplexed switch 557 and a message switch 559. The time multiplexed switch 557 provides time division transfer of digital voice data packets between voice channels of the interface modules 551 and transfers data messages between the interface modules. The message switch 559 interfaces the administrative module 555 to the time multiplexed switch 557, so as to provide a route through the time multiplexed switch permitting two-way transfer of control related messages between the interface modules 551 and the administrative module 555. In addition, the message switch 559 terminates special data links, for example a link for receiving a synchronization carrier used to maintain digital synchronism.

The administrative module 555 includes an administrative module processor 561, which is a computer equipped with disc storage 563, for overall control of central office operations. The administrative module processor 561 communicates with the interface modules 551 through the communication module 555. The administrative module 555 also includes one or more input/output (I/O) processors 565 providing interfaces to terminal devices for technicians, such as shown at 566 in the drawing, and data links to operations systems for traffic, billing, maintenance data, etc. A CCIS terminal 573 and an associated data unit 571 provide a signaling link between the administrative module processor 561 and an SS7 network connection to an STP or the like (see FIG. 2), for facilitating call processing signal communications with other central offices and with the ISCP 540.

As illustrated in FIG. 3, the administrative module 555 also includes a call store 567 and a program store 569. Although shown as separate elements for convenience, these are typically implemented as memory elements within the computer serving as the administrative module processor 561. For each call in progress, the call store 567 stores translation information retrieved from disc storage 563 together with routing information and any temporary information needed for processing the call. The program store 569 stores program instructions which direct operations of the computer serving as the administrative module processor.

Figure 4:
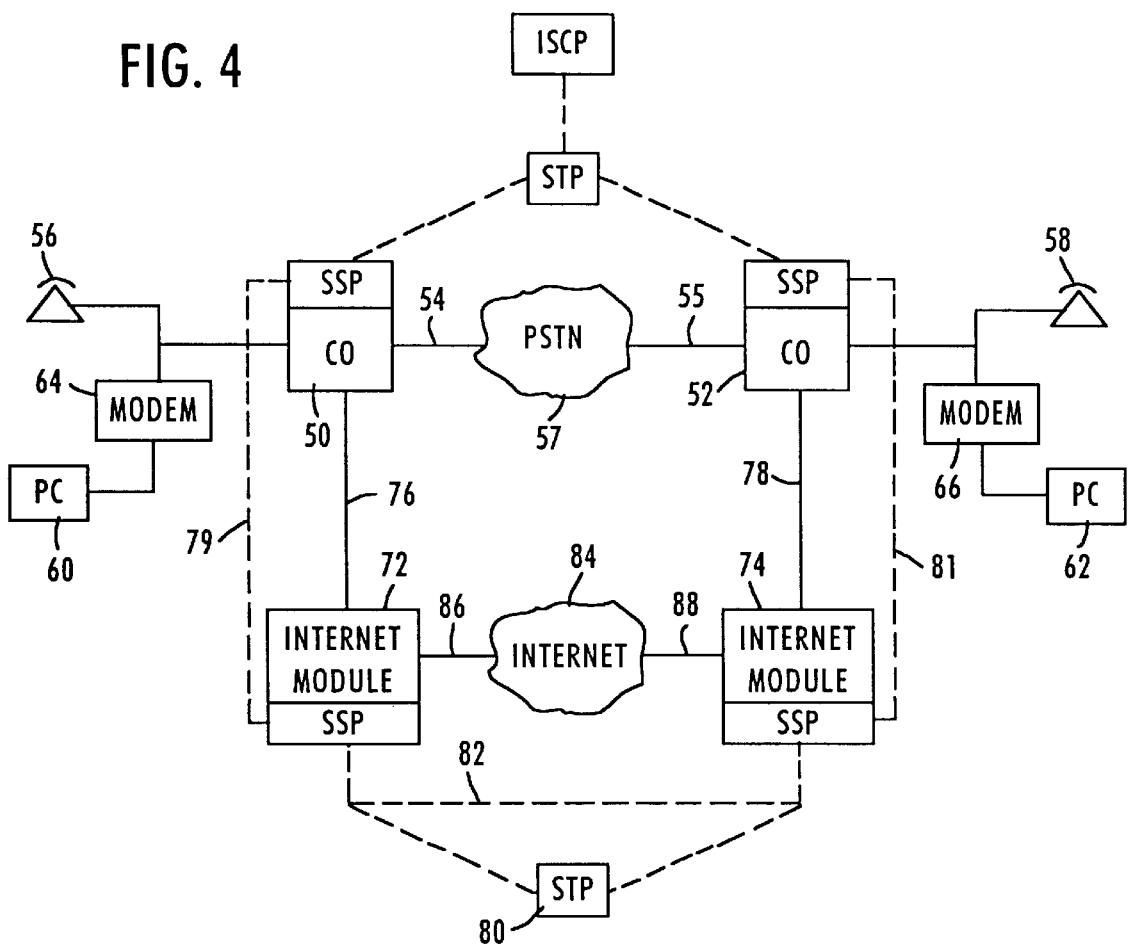
FIG. 4 shows the functional architecture of one embodiment of an Internet Module for use in the system and method of the invention.

Referring to FIG. 4 there is shown a simplified block diagram of an AIN controlled PSTN, such as the type shown in more detail in FIG. 2, which includes architecture for implementing one preferred embodiment of the invention. Referring to that figure there are shown two SSP capable central offices 50 and 52 which may be located in the same or different states and regions. These central offices are connected by trunks indicated at 54 and 55 to the PSTN indicated by a cloud 57. Each central office is connected by local loops to subscribers customer premises equipment (CPE) such as telephone terminals 56 and 58. These may be basic instruments for providing Plain Old Telephone Service (POTS). The subscriber premises are also shown as having personal computers (PCs) 60 and 62 connected to the local loops via modems 64 and 66. The SSPs associated with the central offices 50 and 52 are connected by CCIS links to an STP which in turn may be connected to an ISCP. While the STP functionality is here shown as constituting a single STP it will be appreciated that this is for the purpose of simplicity only and that a hierarchy of STPs may be involved.

According to this embodiment of the invention each of the central offices 50 and 52 is provided with an Internet Module here indicated at 72 and 74 connected by T1 trunks 76 and 78. Alternatively the Internet Module hardware may be situated at the central office and associated with the switching system. The Internet Modules may be provided with SSP capabilities and connected into the CCIS network as indicated by the links to the illustrative STP 80. The SSPs serving the Internet Module are inter-connected with the central office SSPs and CCIS network as shown here by illustrative links 79 and 81. The Internet Modules may be linked for signaling purposes by conventional F links indicated at 82. The Internet Modules are connected to the Internet cloud by T1/T3 trunks 86 and 88.

Figure 1:
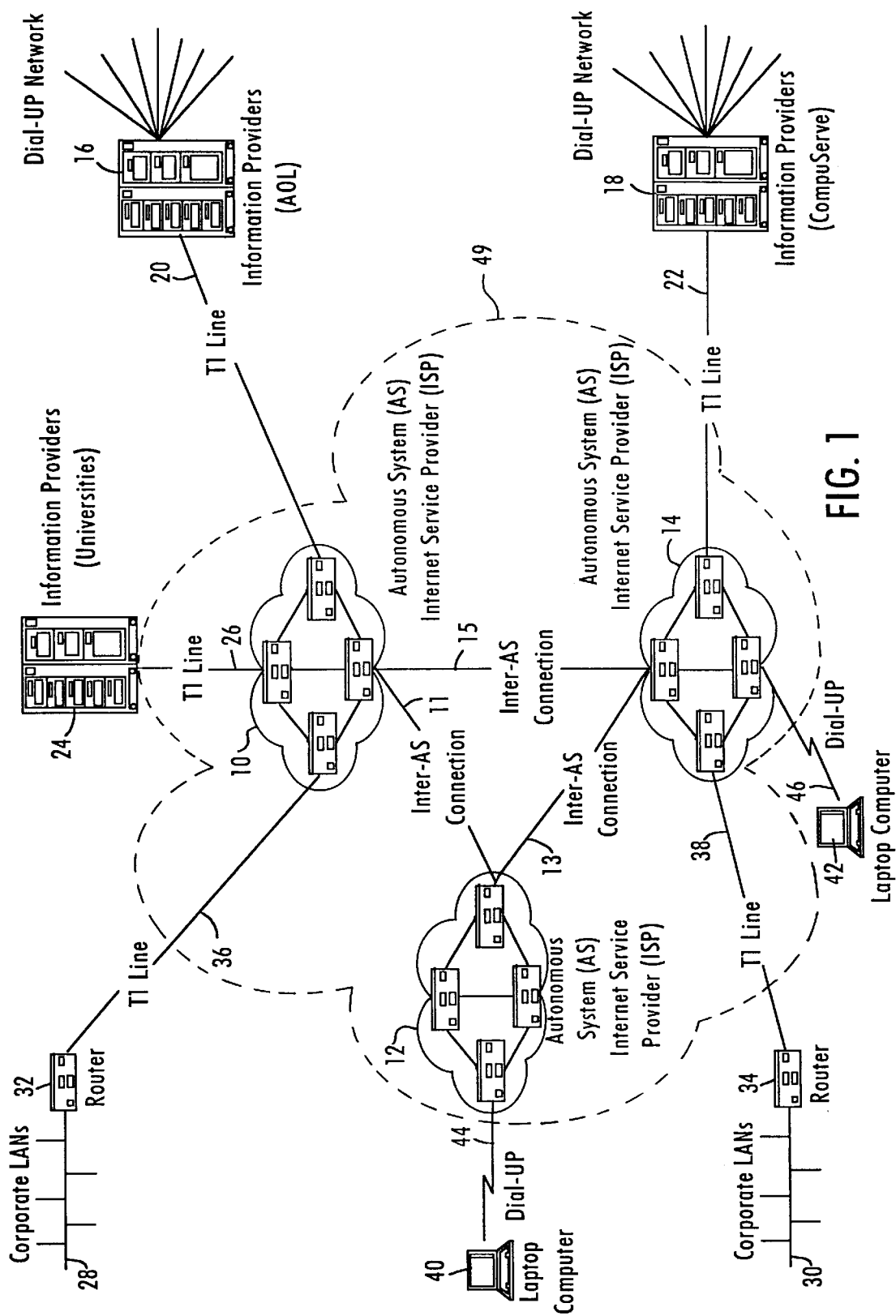
FIG. 1 is a simplified diagram of the Internet.
Figure 5:
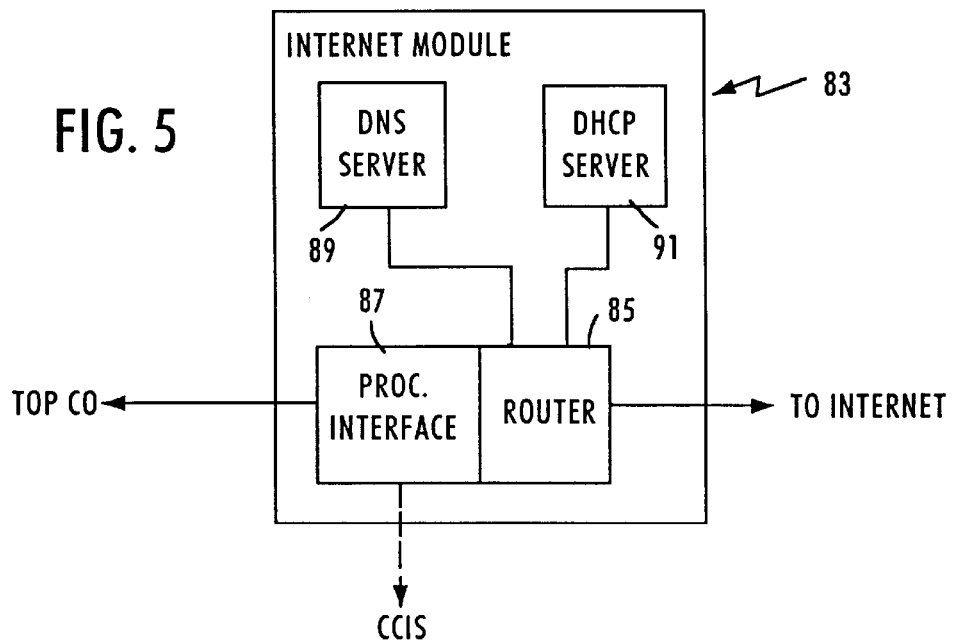
FIG. 5 shows in diagrammatic form the functional architecture of one embodiment of an Internet Module for use in the invention.

The functional architecture of one embodiment of an Internet Module for use in the invention is shown diagrammatically in FIG. 5. The Internet Module, generally indicated at 83, includes a router 85 of the type now generally used in Internet practice, such as shown in FIG. 1 and described in related application Ser. No. 08/634,544, (Attorney Docket No.680-170) referenced above. For performing some functions according to certain embodiments of the invention the router may be provided with an interface with processing capability as illustratively shown at 87. Connected to the router are a Domain Name Service (DNS) server 89 and a Dynamic Host Configuration Protocol (DHCP) server 91 of the type conventionally used by Internet Service Providers in existing Internet Service. The router interface is connected to the central office and to the CCIS network while the router is connected to the Internet.

Figure 6:
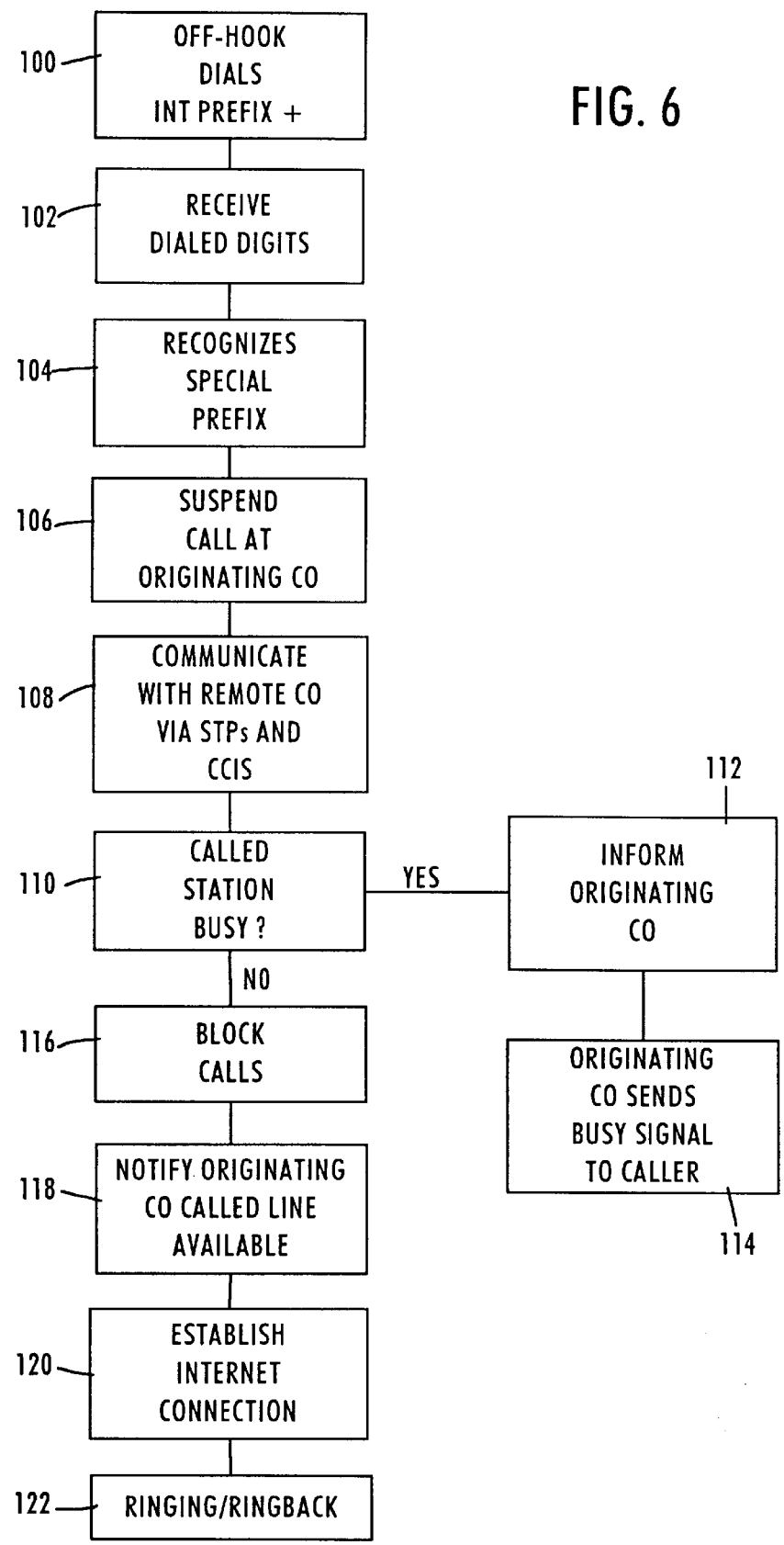
FIGS. 6 and 7 illustrate in simplified flow diagrams one mode of operation of the system of FIG. 4.
Figure 7:
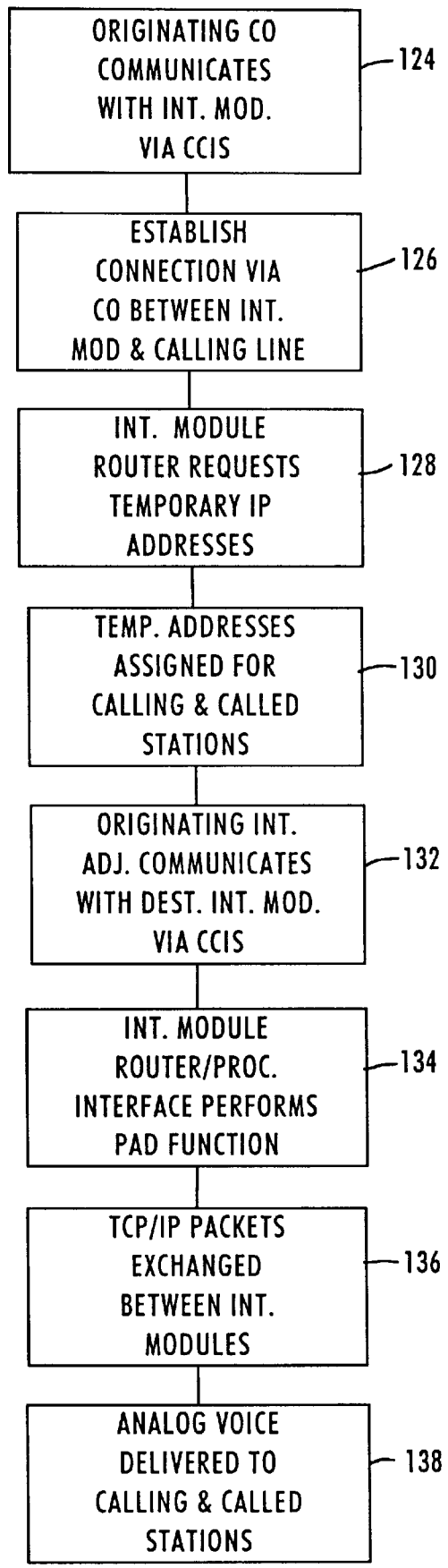

One mode of operation of the system of FIG. 4 is now described in relation to the simplified flow diagrams of FIGS. 6 and 7. According to this embodiment an Internet connection is used to link a calling to a called telephone without the necessity of either party possessing or using personal or office computer equipment. The subscriber in this example uses the POTS station at 56 to initiate an Internet call to a called party at the POTS station 58. The caller goes off-hook and dials *82. This prefix has been established by the TelCo offering the service as a predesignated prefix with which the public may initiate an Internet telephone call. The dialing of the prefix *82 is followed by the dialing of the directory number of the called party at the station 58.

As is illustrated in the method shown in FIG. 5, the calling party goes off-hook and dials the prefix *82 at 100. At 102 the central office switching system responds to an off-hook and receives the dialed digits from the calling station. At 104 the central office switching system analyzes the received digits and determines from the prefix *82 that the call is an Internet call. Responsive to its programming it knows that the call must be completed through a remote central office and that further processing is necessary. At 106 the local or originating central office suspends the call and at 108 sends a CCIS query message through one or more of the STPs.

The query message goes to the central office to which the called station is connected. The receiving or destination central office receives the query and determines at 110 whether or not the called station at 58 is busy. If the called station is busy, the receiving central office so informs the originating central office at 112. At 114 the originating central office provides a busy signal to the calling station.

If the called station is not busy, the receiving central office busies out the called station line by blocking all calls at 116. The receiving or destination central office then informs the originating central office that the called line is available and waiting at 118 and that the processor in the Internet Module associated with the central office 52 is available.

An Internet virtual connection is then established between the calling and called stations at 120 as presently will be described in detail. The receiving or destination central office provides a ringing signal to the called station and the originating central office sends ringback tone back through the local loop to the calling station at 122. When the called station goes off-hook and the Internet virtual connection is completed the conversation via the Internet can commence.

Referring next to the flow diagram in FIG. 7 one embodiment of the set up of the Internet connection is now described. When the originating central office receives from the destination central office the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. This CCIS or SS7 communication between the originating central office and the originating Internet Module is indicated at 124. When the originating central office receives the message that the addresses have been assigned the switching system connects the originating local loop to the Internet Module 72. This connection is indicated at 126.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing embodiments of the initial connection steps, the Internet Module router 85 in the Internet Module 72 sends a request for the assignment of temporary IP addresses for the two directory numbers to the DHCP server 91 as indicated at 128. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned at 130. At 132 originating Internet Module 72 triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module the address may be obtained at the receiving central office switching system and its associated Internet Module and communicated to the originating central office switching system via the common channel signaling link.

As the conversation commences the originating Internet Module 72 is receiving from the originating central office 50 over the trunk connection digitized speech in DS0 format. The Internet Module implements the function of a packet assembler and disassembler or PAD and assembles packets in TCP/IP format. This is indicated at 134. The packets bear the source and destination IP addresses and the digitized speech payload. The packets are dispatched from the originating router 85 onto the Internet and are delivered to the destination router and Internet Module 74. The receiving router and associated processor have the directory number of the called party and the matching IP address which were obtained via CCIS signaling from the originating router as indicated at step 132 described hereinabove. The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal. The packet exchange is indicated in FIG. 7 at 136. The two way transfer of voice signals is indicated at 138.

Upon the establishment of the line/trunk connection to the Internet Module the originating central office may send billing information to the switch journal which indicates that an Internet call has been initiated and that may be recorded in the conventional manner. The DHCP server may also incorporate a billing capability which may be utilized as an alternative to journal billing if desired. Thus the DHCP server may initiate a clocking mechanism upon the assigning of the IP addresses to start the clock for charging the customer. When the IP address is released tolling of the charge ceases with a time based stamping attributed to the IP assignment.

Figure 8:
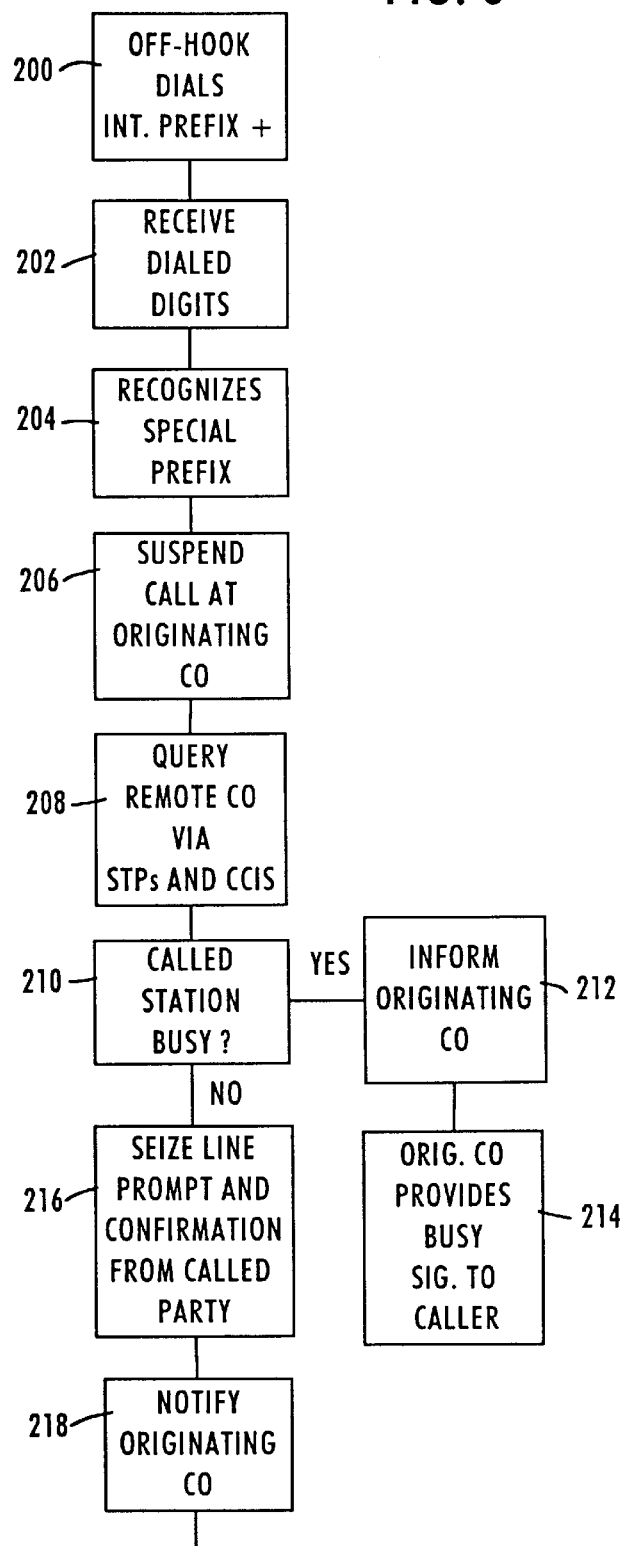
FIG. 8 illustrates another mode of operation of the system of FIG. 4 in simplified flow diagram form.
Figure 8:
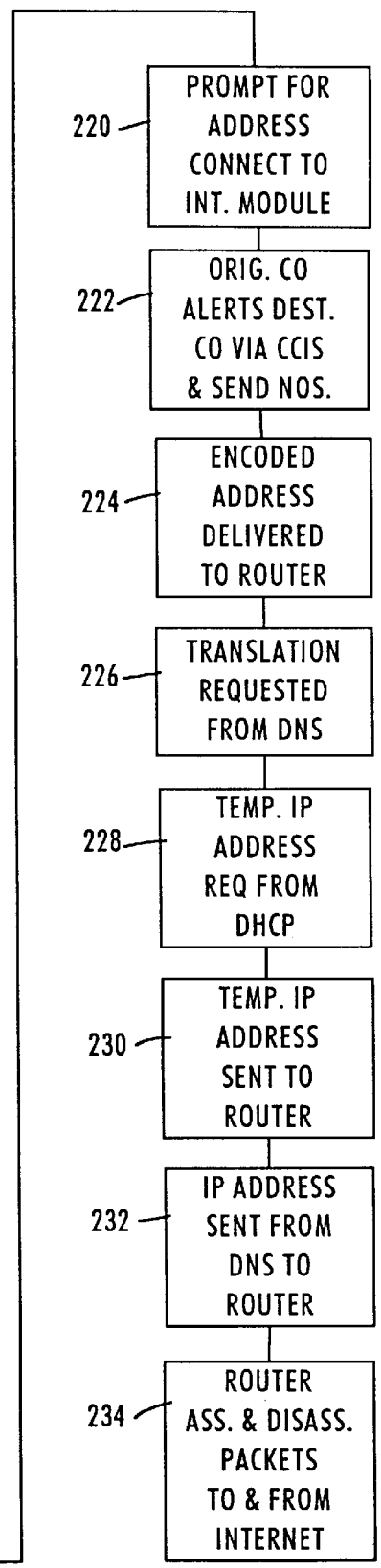

Another mode of operation of the system of FIG. 4 is now described in relation to the simplified flow diagram of FIG. 8. A customer using the POTS station at 56 as an originating station desires a voice connection to a called party on the premises of the POTS station 58. The calling party is aware that the proposed called party has at those premises a personal computer with voice capabilities and has knowledge of the Internet domain or hostname address of the proposed called party.

The TelCo offering the service of the invention has established a prefix *82 for a telephone to telephone call as has been described in the previously discussed example. In this embodiment the TelCo also establishes a second prefix *83 for voice communication from telephone to a voice capable computer possessing an Internet address. The communication establishment is here commenced by the calling party going off-hook and dialing the prefix *83 at 200.

At 202 the central office switching system at the originating central office responds to an off-hook and receives the dialed digits from the calling station. At 204 the central office switching system analyzes the received digits and determines from the prefix *83 that the call is an Internet call from a telephone station caller to a computer terminal at the customer premises of the called party. Responsive to its programming the originating office switching system knows that the call must be completed through a remote central office and that further processing is necessary. At 206 the local or originating central office suspends the call and at 208 sends a CCIS query message through one or more of the STPs.

The query message goes to the central office to which the called station is connected as determined by the called directory number that was dialed by the caller. The receiving or destination central office receives the query and determines at 210 whether or not the local loop to the premises of the station at 58 is busy. If the called local loop is busy, the receiving central office so informs the originating central office at 212. At 214 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. This is shown at step 216. A distinctive ring may be used in lieu of the prompt or together with the prompt to alert the receiving party that a telephone call is arriving via the Internet and that it will be handled by microphone and speaker associated with the sound card in the called party's computer.

The receiving or destination central office then informs the originating central office that the called line is available and that the computer is waiting at 218. As an alternative to this procedure the destination central office may alert the called computer by applying an alert signal between the tones of the ringing signal.

The originating central office issues a voice prompt to the calling party requesting that party to spell out the domain or hostname of the called party and immediately completes the trunk connection from the originating central office to the originating Internet Module. This step is shown in FIG. 8 at 220. Simultaneously the originating central office alerts the originating Internet Module that a domain or hostname call has been initiated and sends the directory numbers of the calling and called party. This parallel step is indicated at 222.

Figure 9:
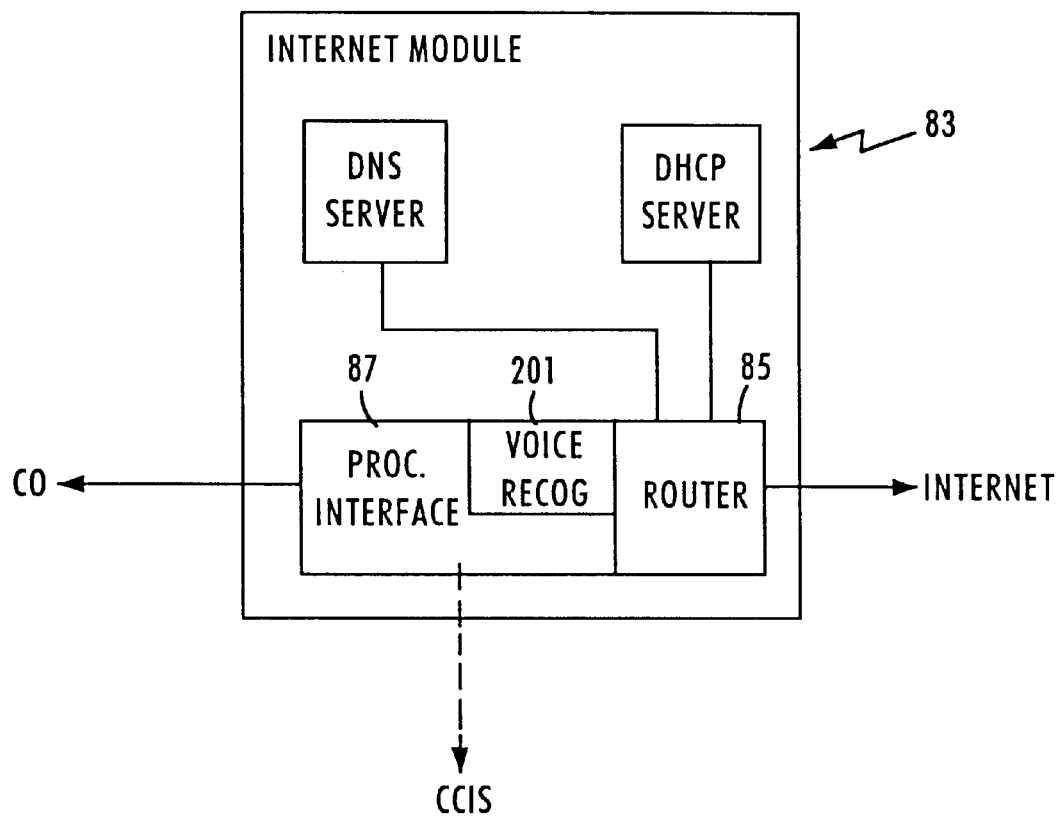
FIG. 9 illustrates in block diagram form another embodiment of an Internet Module for use in the invention.

In this embodiment of the invention the Internet Module is provided with a processor interface to the router which includes a voice recognition card to translate the incoming address to a TCP/IP format signal. An Internet Module of this type is illustrated in FIG. 9 where the voice card is shown at 201. The arriving address signal is delivered by the voice card and processor interface to the router 85. This step is shown at 224 in FIG. 8.

The router requests a domain name translation from the DNS server 89. This is indicated at step 226. At substantially the same time the router broadcasts a request for a temporary IP address for the calling directory number. This is indicated at step 228. The DHCP server provides the caller with a temporary IP address from the pool of addresses supplied by the Internet Service Provider which in this case is the TelCo. The DHCP server selects an address from the pool and sends the address to the router at 230.

The Domain Name Service (DNS) server provides the translation from the domain or host name supplied by the caller into an IP address. Since each site maintains its own server no single site on the Internet is in possession of all of the translation data. The overall data constitutes a distributed database and relies on the servers at the individual sites. Access to the DNS is through a resolver and software library functions. The function in this case takes a domain name or hostname and returns an IP address. The functionality also is capable of providing the inverse function of taking an IP address and returning a hostname.

The IP address is sent by the DNS server to the router for incorporation into the packets to be assembled and dispatched onto the Internet. This step is shown at step 232. The router and its processor interface again serve a PAD function and transmit and receive TCP/IP packets to the Internet. This is indicated at 234.

In this embodiment of the invention the originating Internet Module and its processor interfaced router perform the functions of signal compression and expansion as well as packet assembly and disassembly (PAD). Thus the incoming DSO signals from the originating central office are compressed from the 64 kbs DSO rate to a 28.8 kbs modem rate assembled into TCP/IP protocol. The TCP/IP signals are transmitted via the Internet to the destination Internet Module 74. In this case the destination Internet Module may deliver the incoming TCP/IP signal direct to the computer modem 66. The voice communication may continue between the caller using the telephone station at 56 and the called party using the called computer at 62.

Figure 10:
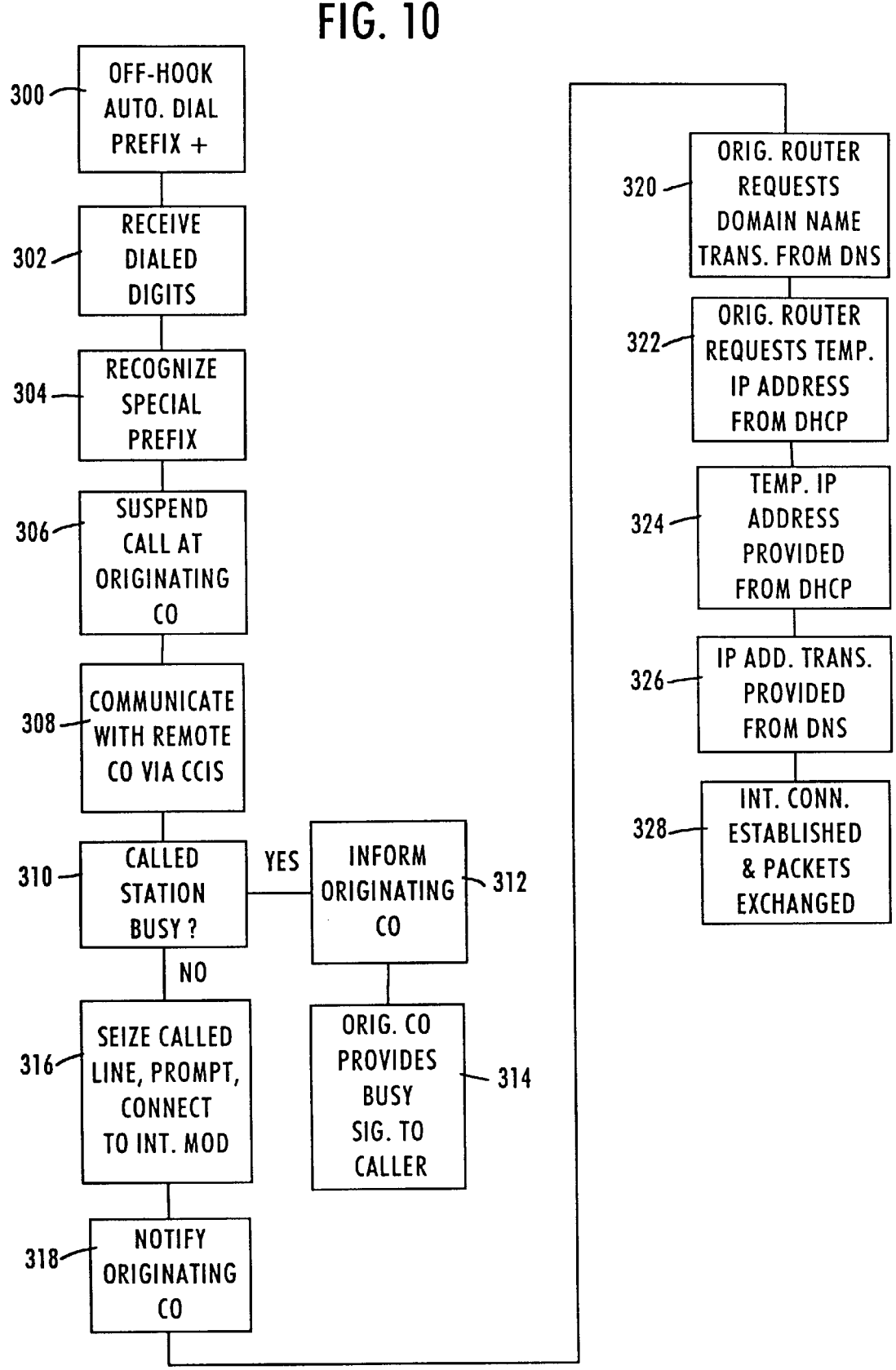
FIG. 10 shows a still further mode of operation of the system of the invention in simplified flow diagram form.

A still further mode of operation of the system of the invention is now described in relation to the simplified flow diagram of FIG. 10. According to this mode a voice connection may be established between a calling computer which may not have Internet access or an Internet address.

At 300 in FIG. 10 the calling PC 60 having voice functionality auto-dials the designated prefix which in this case may be *64. In addition to the prefix the computer dials the directory number of the called party and the domain or hostname of the called CPE computer. At 302 the central office switching system at the originating central office responds to the off-hook and receives the dialed digits from the calling station. At 304 the central office switching system analyzes the received digits and determines from the prefix *84 that the call is an Internet call from a computer station caller to a computer terminal at the customer premises of the called party. Responsive to its programming the originating office switching system knows that the call must be completed from a local computer through a remote central office and that further processing is necessary. At 306 the local or originating central office suspends the call and at 308 sends a CCIS query message through one or more of the STPs.

The query message goes to the central office to which the called station is connected as determined by the called directory number that was dialed by the caller. The receiving or destination central office receives the query and determines at 310 whether or not the local loop to the premises of the computer 62 is busy. If the called local loop is busy, the receiving central office so informs the originating central office at 312. At 314 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. The trunk connection from the destination central office to the destination Internet Module is completed. This is shown at step 316.

A distinctive ring may be used in lieu of the prompt or together with the prompt to alert the receiving party that a telephone call is arriving via the Internet and that it will be handled by microphone and speaker associated with the sound card in the called party's computer. As a still further alternative the destination central office may send a wake-up or alerting signal to the called computer between the ringing signals. The receiving or destination central office then informs the originating central office that the called line is available and that the computer is waiting at 318.

The router at the originating Internet Module requests a domain name translation from the DNS server 89. This is indicated at step 320. At substantially the same time the router broadcasts a request for a temporary IP address for the calling directory number. This is indicated at step 322. The DHCP server provides the caller with a temporary IP address from the pool of addresses supplied by the Internet Service Provider which in this case is the TelCo. The DHCP server selects an address from the pool and sends the address to the router at 324.

The Domain Name Service (DNS) server provides the translation from the domain or host name supplied by the caller into an IP address. This IP address is supplied to the router and its associated processor interface at 326. The router is now in possession of the necessary information to perform it PAD function upon the data received from and delivered to the calling computer 60. The Internet connection or virtual connection is established at 328 and the voice communication from computer to computer may proceed.

While this illustration of computer to computer voice connection involved a calling computer without an Internet address and a called computer with an Internet address it will be obvious to those skilled in the art that the described methodology is also applicable to set ups where neither party has an Internet address as was the case with the telephone to telephone Internet connection.

Figure 13:
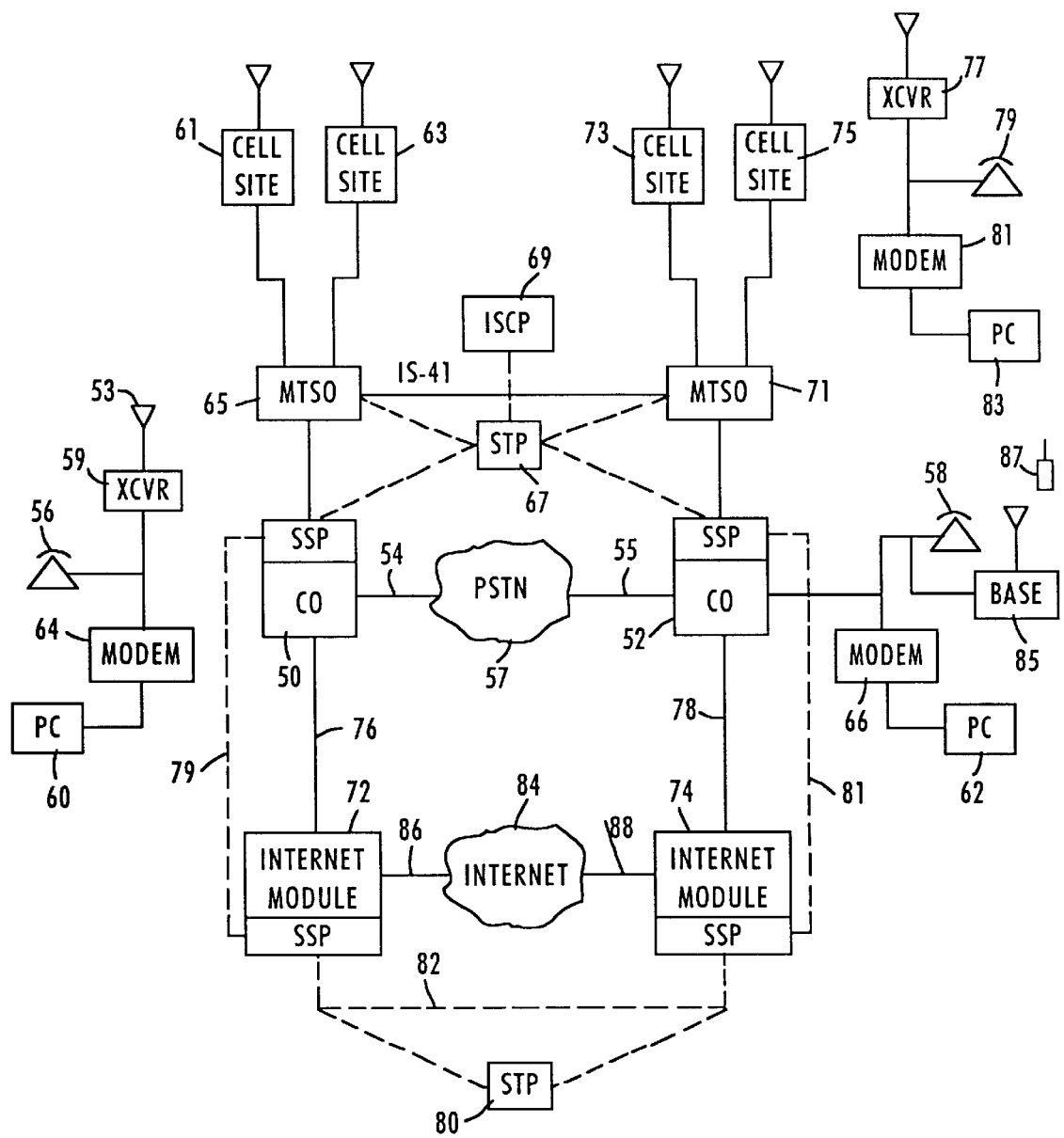
FIG. 13 is a block diagram of another embodiment of the invention permitting wireless operation.

Referring to FIG. 13 there is shown an embodiment of the invention which provides wireless connection to the Internet. In providing such wireless access a wireless station, such as a cellular station, is utilized in a manner to permit such wireless station to communicate with the CCIS or AIN network.

Figure 11:
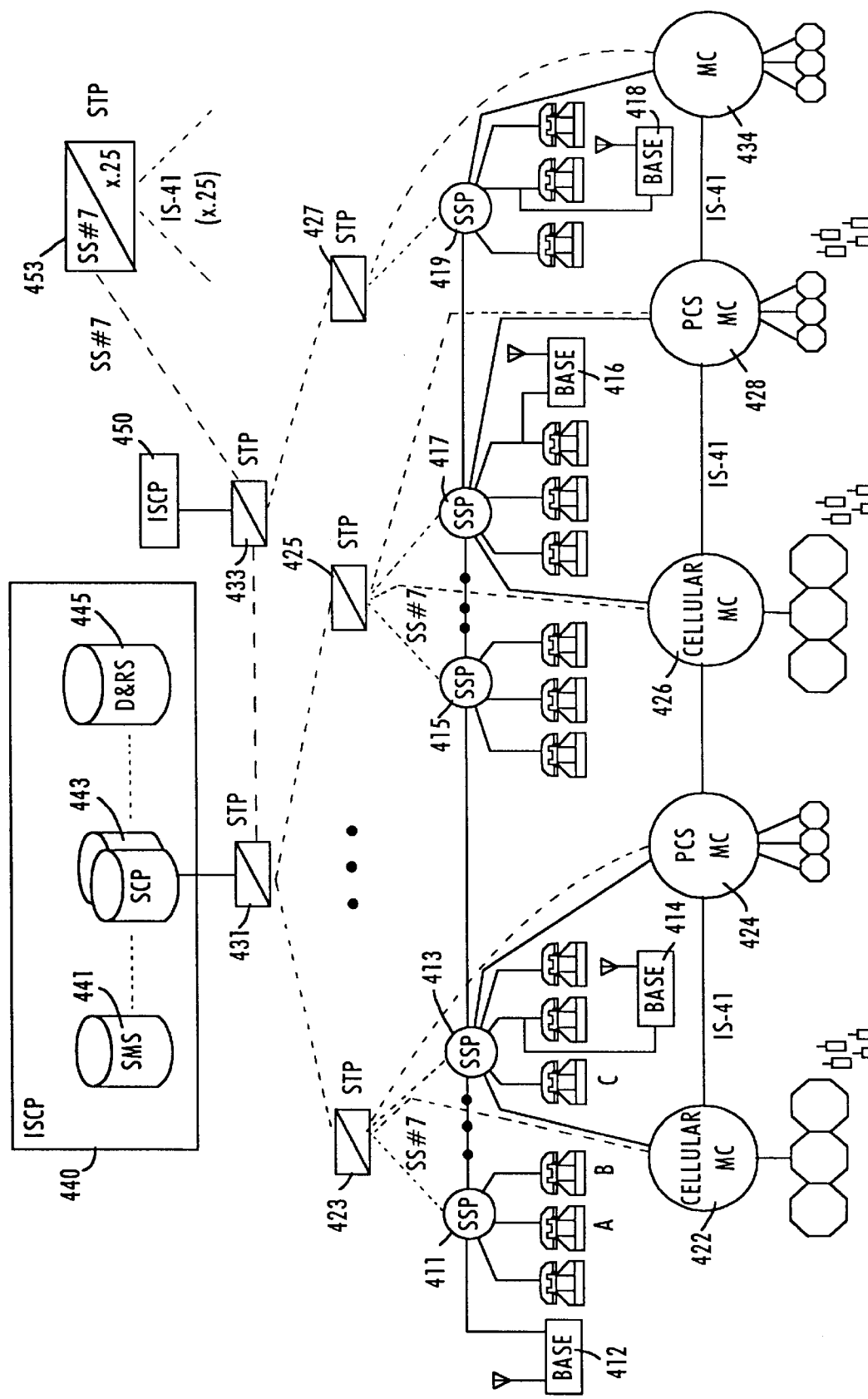
FIG. 11 is a block diagram depicting modifications of the AIN system of FIG. 2 to carry out personal communication system activities.

Integration of wireless communication networks, such as cellular communication systems, and land line AINs has been carried out in the manner disclosed by U.S. Pat. No. 5,353,331 to Emery et al., incorporated herein by reference. This system also provides for the use of Personal Communication Systems or Service (PCS). FIG. 11 depicts the modifications needed to the AIN network of FIG. 2 in order to accommodate the use of cellular communication data with the AIN in order to carry out the necessary functions of this embodiment of the invention.

SSPs can be programmed to recognize a number of different triggers as an indication that a call is an AIN call. For example, the trigger can relate to the identification of the telephone line from which a call or other request for service originates, and such a trigger is useful for activating certain services to be discussed later. At least initially, however, for incoming PCS type calls the trigger is based on a recognition that the terminating station identified by the destination number is a PCS subscriber.

As shown in FIG. 11, all of the COs 411, 413, 415, 417 and 419 are equipped and programmed to serve as SSPs. Such central office switching systems typically consist of the above discussed class 4/5 programmable digital switch with CCIS communications capabilities. One current example of such a switch is a 5ESS type switch manufactured by AT&T; but other vendors, such as Northern Telecom and Seimens, manufacture comparable digital switches which could serve as the SSPs. The illustrated embodiment is perhaps an ideal implementation which would make the Personal Communication Service widely available at the local office level throughout the network. Other implementations provide the SSP functionality only at selected points in the network, and telephone end offices without such functionality forward calls to one of the SSPs.

A number of subscriber telephone lines connect to each of the SSPs which provide switched telephone communications services to subscriber terminals coupled to those telephone lines. Many of the TelCo's subscriber's will still have ordinary telephone terminals, as shown. Those who subscribe to PCS will have a home base unit, such as shown at 412, 414, 416 and 418. The base unit may be the only terminal device connected to a particular telephone line, as is base unit 412, or the base may connect to the line in parallel with one or more standard telephone station sets as does base unit 414.

To provide wireless mobile communications, the network further includes a number of Mobility Controllers or "MCs" (also called Mobile Telephone Switching Offices or MTSOs) which communicate with the SSPs, STPs and ISCP of the AIN type telephone network. As shown in the drawing, the network includes cellular MCs 422 and 426 and MCs 424 and 428 constructed specifically for PCS. Each of the MCs connects to an SSP type central office switch via a voice telephone trunk, shown in solid lines. MCs 422, 424, 426 and 428 each also connect to one of the STPs via an SS7 link.

The system for implementing Personal Communication Service in one telephone company service area or perhaps one LATA includes a number of the SSP capable CO switches, such as the SSPs shown at 411, 413, 415, and 417. The SSP type central offices are each at a different location and distributed throughout the area or region served by the PCS system. The PCS system of one regional TelCo will connect to networks serving other regions, for example the networks of other TelCos. The switch 19 in FIG. 11 represents one of the SSP switches of a second TelCo implementing a PCS service.

The SSPs 411 and 413 connect to a first local area STP 423, and the SSPs 415 and 417 connect to a second local area STP 425. The connections to the STPs are for signaling purposes. As indicated by the black dots below STPs 423 and 425, each local area STP can connect to a large number of the SSPs. As shown by solid lines in FIG. 11, the central offices or SSPs are interconnected to each other by trunk circuits for carrying telephone services.

The network of the second TelCo can have an architecture essentially similar to that described above. For example, as shown in FIG. 11 the SSP 419 connects to a first local area STP 427 via an SS7 link, and SSP 419 connects to one or more central offices or SSPs including SSP 417 by means of trunk circuits for carrying telephone services. The local area STP 427 communicates with a state or regional STP 433 of the second TelCo. The STP 433 provides CCIS type data communications with the second TelCo's ISCP 450 and with the SSPs and ISCPs of other TelCos, for example by packet switched connection to STP 431. The link between the SSP 419 and the local area STP is a CCIS link, typically an SS7 type interoffice data communication channel. The local area STP is connected to the regional STP 433 via a packet switched network also typically SS7. The regional STP 433 also communicates with the ISCP 450 via a packet switched network. The second TelCo's network further includes a number of MCs such as MC 434, each of which will communicate with the SSPs, STPs and ISCP of the AIN type telephone network. Like the MCs of the first TelCo, MC 434 connects to an SSP 419 via a voice telephone trunk, shown as a solid line. MC 434 also connects to the local area STP 427 via an SS7 link.

The above described data signaling network between the COs and the ISCP is preferred, but other signaling networks could be used. For example, instead of the CCIS links, STPs and packet networks, a number of MCs together with several COs and an ISCP could be linked for data communication by a token ring network. Also, the SSP capability may not always be available at the local office level, and several other implementations might be used to provide the requisite SSP capability. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS7 type CCIS link. In another embodiment, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIGS. 2 and 11. For those end offices which lack SSP capability, calls are forwarded to the SSP capable trunk tandem which in turn relays data to and from the ISCP. In these alternate embodiments, the SSP capable trunk tandem switches are digital switches, such as the 5ESS switch from AT&T; and the non-SSP type end offices might be 1A analog type switches.

The Mobility Controllers such as 422 are connected with each other via IS-41 protocol trunks for exchange of data relating to handoff and to exchange of data for extending services to visiting subscribers of distant cellular systems who are not subscribers to PCS. The IS-41 data trunks are actually a packet switched network, which may be either an X.25 network or an SS7 network. To provide handoff during a wireless call in progress, the MCs are also interconnected via trunk circuits (not shown).

To allow data communication of HLR data registered in the ISCPs 440, 450, to visitor location registers in remote MCs, the network further includes a hub STP 453. The hub STP connects to an X.25 packet switched data network, which currently carries IS-41 data messages between existing MCs outside the PCS service area. The hub STP 453 couples IS-41 messages between the X.25 network and the SS7 network, shown by the dotted line data communication link to the regional STP 433. The communication through the hub STP 453 allows outside MCs to communicate with the ISCPs of both TelCos providing the PCS type services as if the ISCPs 440, 450 were home location MCs for the PCS subscribers when PCS subscriber is visiting another service area.

The messages transmitted between the SSPs and the ISCPs are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

The ISCP 440 is an integrated system. Among other system components, the ISCP 440 includes an SMS 441, a DR&S) 445 and the actual data base or Service Control Point (SCP) 443. The ISCP also typically includes a terminal subsystem referred to as an SCE (not shown) for programming the data base in the SCP 443 for the services subscribed to by each individual business customer. Although not shown in detail, other ISCPs such as 450 will typically have a similar integrated system structure. Alternatively, ISCP 450 may not be an "integrated" system. For example, the second unit 450 may include only a data base system similar to that of the Service Control Point (SCP) 443.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 411 provides the call connection without any connection to another central office. When the called line connects to a distant station, for example when station A calls station C, the connection is made through the connected central office switching system SSP 411 and at least one other central office switching system SSP 413 through the telephone trunks interconnection the two COs.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited trunk capacity. The CCIS system through the STPs was developed to alleviate this problem.

In the CCIS type call processing method the local central office suspends the call and sends a query message through one or more of the STPs. The query message goes to the central office to which the called station is connected, referred to as the "terminating" central office; for example, the query would go from originating SSP 411 to terminating SSP 413. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to land lines. In an AIN system implementing Personal Communication Service, these normal call processing routines would still be executed for completion of calls originating from stations not subscribing to the Personal Communication Service.

In one implementation, the local SSP type COs are programmed to recognize any call directed to any one of the PCS subscribers associated therewith as a Personal Communication Service Call. In response to such a call destination type trigger, the CO associated with the destination subscriber, i.e the terminating SSP, would communicate with the ISCP via an STP to obtain all necessary call processing data to complete the PCS call to the subscriber's portable handset at its current location. It is also possible to program originating SSPs to determine whether or not outgoing calls are directed to PCS subscribers and trigger the communications with the ISCP at the originating SSP instead of the terminating SSP.

To extend special telephone services from the AIN to subscribers communicating via the mobile network will require adapting the MCs to trigger queries to the ISCP in response to outgoing call or service requests. One way to do this is to modify the switch structure and programming of the MCs so that each MC includes SSP functionality similar to that of the telephone network SSPs. Another approach is to modify the MCs to forward calls to an SSP capable switch or tandem, with outpulsing of the originating subscriber data, so as to process the calls via the tandem in manners similar to those used for non-SSP capable end offices switches discussed earlier.

As the scope of AIN operation increases, additional burdens are placed upon the CCIS system necessary to carry out the triggering function that is at the heart of the AIN functionality. Also, not all company office switches are programmed for SSP functionality. Nor are there always land line data links to carry the CCIS operation between crucial elements of the system. The lack of these two elements in any given area may render effective use of an AIN impossible. Replacing or retrofitting existing company office switches can be expensive and time consuming, as can the installation of additional land line data links.

Despite the elegance of the PCS arrangement of the Emery et al. patent, interfaces between mobile subscribers and the AIN may be cumbersome. This limits the amount and type of data that can be input to an AIN system by a mobile subscriber.

This limitation may be overcome through the use of a combined land line and wireless communication system including an Advanced Intelligent Network (AIN) including switching entities and control entities and a Common Channel Interoffice Signaling (CCIS) connecting the switching and control entities of the AIN. Also included is a Cellular Digital Packet Data (CDPD) arranged for communication with wireless subscriber units, and having a plurality of Mobile Data Base Stations (MDBS) and at least one CDPD controller. Further included are an interface between the AIN system and the CDPD system as well as means for translating between CDPD protocol and CCIS protocol. Such a network is described in detail in the application Ser. No. 08/592,441, System for Sending Control Signals from a Subscriber Station to a Network Controller Using Cellular Digital Packet Data (CDPD) Communication, Attorney Ref. 680-164. That application is incorporated herein by reference in its entirety.

Figure 12:
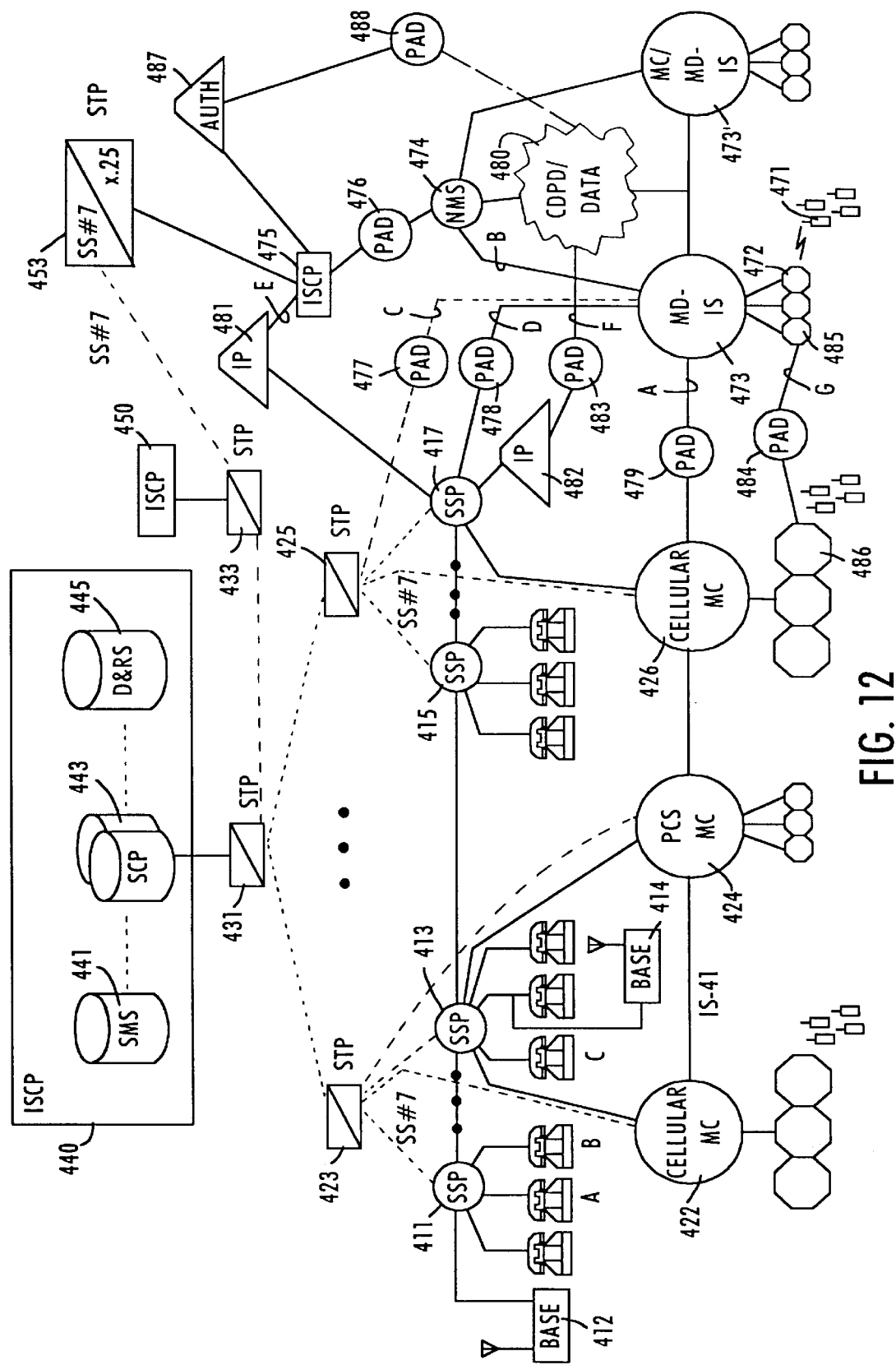
FIG. 12 is a block diagram depicting a plurality of connection arrangements allowing data to be input to the AIN system from a wireless subscriber station.

FIG. 12 depicts the land line AIN integrated with a cellular system and a personal communications system as previously illustrated in FIG. 11. Also included are CDPD structures used to interface with the AIN, as well as a CDPD/data network 480. As will be apparent from the following explanation, there are a number of ways in which the CDPD system can interface with either the Advanced Mobile Phone Service (AMPS) or AIN land line systems.

Subscriber station 471 includes the functionality to operate with an analog voice cellular base station 486 or a CDPD base station 472. As previously described, the subscriber station 471 will communication with only one system at any particular moment in time. However, simultaneous communication with both types of system is possible if a dual transceiver is included in the subscriber station. Normally the functionality of the analog cellular base station 486 and the CDPD mobile data base station 472 are separate from each other. However, it is convenient to locate both types of base station in the same physical location. As is well known, this is done for convenience of construction and to maximize the use of common RF elements for each type of base station, such as antennas, power amplifiers, power supplies, etc.

As the cellular base station 486 is controlled by a cellular Mobility Controller (MC) 426, also known as a Mobile Telephone Switching Office (MTSO), CDPD Mobile Data Base Station 472 is controlled by Mobile Data Intermediate System (MD-IS) 473. The mobile data intermediate sections such as 473 and 4731 are controlled by a Network Management System (NMS) 474, that provides the timing parameters and general system operating parameters to the various controllers in other MD-ISs in the CDPD/data system 80. The necessity of NMS 474 for the overall control of the CDPD system has already been explained previously for normal operation of a CDPD system.

An additional convenience provided by the co-location of the mobility controller and the MD-IS is found in the mutual control that can be provided by a network management system 474. Since both of the analog cellular voice mobility controllers and the CDPD controllers such as MD-IS 473 both need system control when they coordinating entity, a single programming point such as NMS 474 can be used to program and control both types of system. By connecting NMS 474 to ISCP 475 through PAD 476, coordination between a CDPD system and land line AIN can be obtained at a high level of control. A connection carried out at this level can allow programming to be carried out in coordinated fashion for all of the land line, analog cellular voice and CDPD systems. It is noted that ISCP 475 can be co-located with NMS 474. By carrying out the programming at this level, certain codes, tags or identifiers can be designated to be recognized throughout any of the analog cellular voice, land line or CDPD systems. Thus, mobile subscriber station 471 can be pre-programmed with codes that can be used in packet headers to designate certain instruction sets input by the subscriber to be transmitted through the CDPD system to an appropriate ISCP of the land line system.

A key part of such an NMS would be a well known device known as a protocol assembler/disassembler (PAD). A PAD such as 479 accepts a data stream from a CDPD element such as MD-IS 473 and reconfigures the data stream into packets of a length that can be handled by both MTSO 426 and AIN elements such as ISCP 440. A PAD also has the capability of communicating with packet networks using a packet network protocol, X.25, which is the CCITT protocol recommendation that most public and private networks used.

A packet network uses the address field of the packet routed to various entities in both the CDPD and AIN networks. Consequently, it is necessary that the subscriber handset be provided with means for applying the correct destination data so that the packets can be sent to the proper land line destination such as an ISCP. The PAD is also used to carry out error checking routines, as well as assembling and disassembling data blocks to remove defunct header messages and reassemble the useful data into a complete message. In this process, conversion from one type of protocol (such as that used by a CCIS) as converted to another (such as that used by a CDPD system). Consequently, the capability of easily converting CDPD protocol to that used by an AIN or AMPS is well within the capability of one skilled in this art so that additional explanation regarding this technique is not necessary for purposes of this application.

The advantage of the system of FIG. 12 is the facilitation of a request for calling features or authorization from a wireless mobile station through the CDPD system to the ISCP of an AIN. Normally, the provision of the calling features or other authorization is carried out by using the AIN exclusively. However, it is also possible to send authorization signals from an ISCP to an SSP or an IP responsible for providing the calling features via the CDPD system. Confirmation that the calling features had been provided or that the authorization is accepted will be conveyed to the mobile subscriber station via the CDPD system in the same manner that normal data is transmitted to any CDPD mobile subscriber station.

As is well known in this art, there is a home MD-IS for each subscriber of the CDPD system in the same manner that there is a home MTSO for each subscriber in a normal cellular system. Likewise, there is a home SSP for every land line subscriber and a home ISCP controlling the activities of the home SSP. The difficulty in using the CDPD system in conjunction with the AIN rises in that in conventional systems there is no correlation between the data contained in the home SSP or ISCP for a land line subscriber and the data contained in the home and MD-IS for the same subscriber using a CDPD system. Consequently, it is necessary to provide a means by which the subscriber information normally contained in the home controllers of the respective systems can be efficiently exchanged to effect efficient routing of instruction messages when transferring from the CDPD system to the AIN and vice versa.

In the preferred embodiment of the present invention, transfer of information regarding the subscriber is facilitated between the AIN and the CDPD system by virtue of assigning numbers to the home SSP and/or home ISCP. While a subscriber number for the home MD-IS is not necessary, the identification of the home MD-IS is necessary if communication between an AIN and CDPD system takes place outside of the home of the CDPD system or the subscriber. However, techniques for locating the home MD-IS of a foreign roaming subscriber station in a CDPD system is generally beyond the scope of the present application. It is sufficient to know that there are techniques used with PCS operations such as that found in U.S. Pat. No. 5,353,331 to Emery et al. that can facilitate efficient routing to the home MD-IS of a foreign CDPD subscriber.

Referring to FIG. 13 there is shown a simplified block diagram an AIN controlled PSTN, such as the type shown in detail in FIG. 4, which includes architecture for implementing another preferred embodiment of the invention. The same reference numerals are used in FIG. 13 as are used in FIG. 4 to refer to the same elements of the network. This embodiment of the invention provides wireless access to the Internet for conducting dial-up voice communication with distant stations which may be hardwire connected to the PSTN or may be wireless. The present embodiment of the invention contemplates the combination an AIN equipped PSTN and a public wireless telephone network which are interconnected in a manner to permit telephone service between mobile or hand-held cellular telephones, or PCS telephones, etc. and POTS telephone stations connected by land lines to the PSTN, as well as mobile or hand-held cellular telephones or the like at the called station.

FIG. 13 shows in the central lower portion thereof the combined PSTN Internet network described in detail in connection with the embodiment of the invention illustrated in FIG. 4. As stated, the same reference numerals are applied to like elements and those elements are capable of operating in the manner previously described.

A variety of wireless telephone networks can be used. The preferred embodiment utilizes a cellular type wireless telephone. The term cellular here encompasses any wireless telephone network organized to provide service in a geographic area through a series of base stations, each of which serves one portion or cell of the service area. Common cellular systems provide services marketed under names such as "Cellular Telephone" service and "IPCS" service. To communicate via the cellular telephone network, the customer premises telephone station 56 connects to a cellular telephone antenna 57 via a transceiver 59 for telephone calls to and from the POTS station 56. The modem 64 also may handle data communication such as with the PC 60 or other data terminal.

The system shown in FIG. 13 includes at least a portion of a public cellular telephone network. This network includes cellular base station type cell site transceivers 61, 63, a Mobile Telephone Switching Office (MTSO) 65, land line connections between the transceivers 61, 63 and the MTSO 65, and a land line connection from the MTSO to one or more switching offices of the PSTN 53, such as SSP equipped central office 50. Although not shown, portable cellular handsets and mobile cellular telephones all communicate via the cellular network and the PSTN in the conventional manner. The PSTN also provides plain old telephone service to standard land line connected telephone devices. The wireless cellular links bypass the local loop portion of the local PSTN for customers subscribing to cellular telephone service or the like wireless service.

Figure 14:
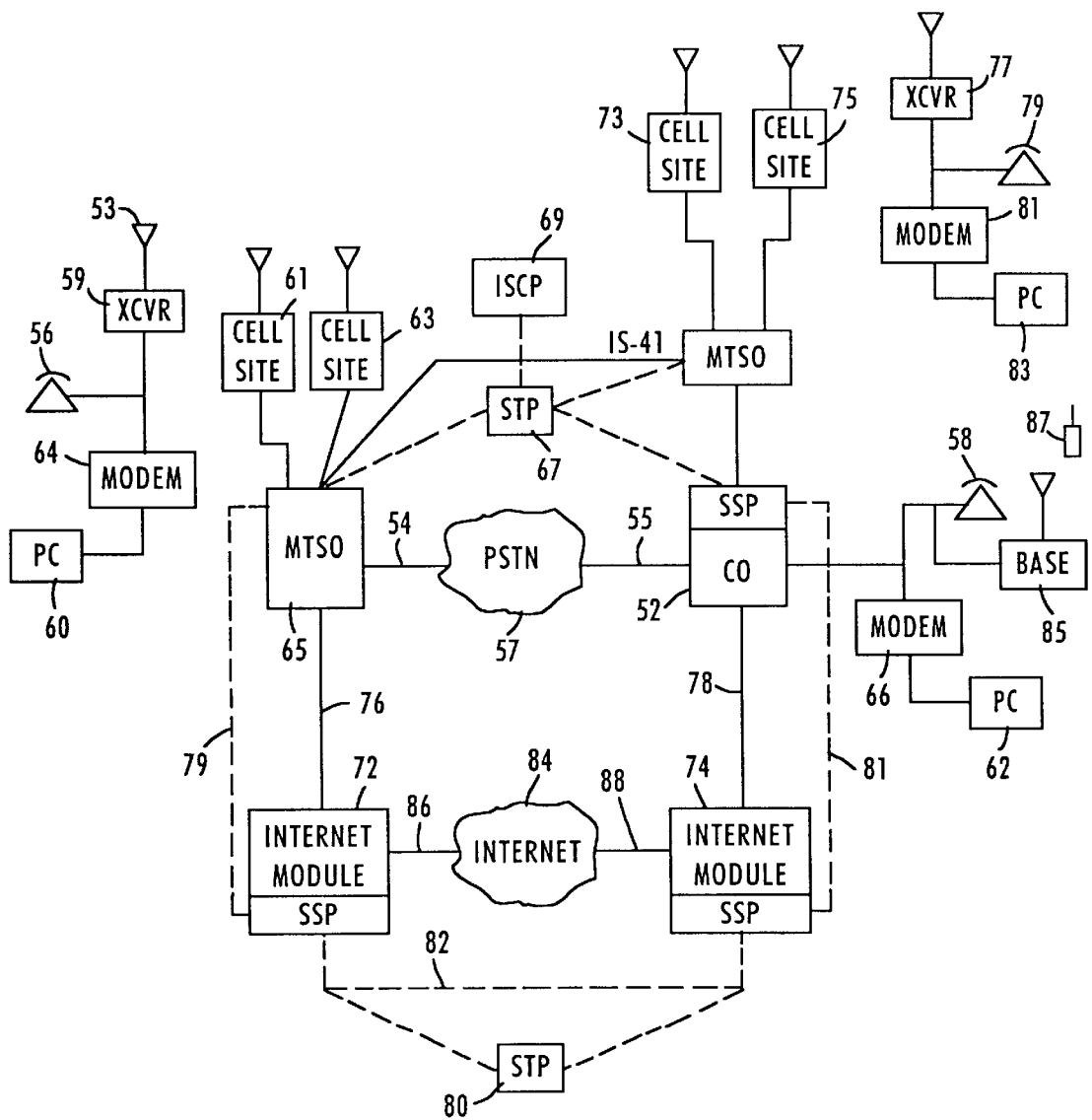
FIG. 14 is a block diagram of still another embodiment of the invention permitting wireless operation.

As previously discussed, integration of wireless communication networks, such as cellular communication systems, and land line AINs has been carried out in the manner disclosed by U.S. Pat. No. 5,353,331 to Emery et al., incorporated herein by reference. That system also provides for the use of Personal Communication Systems (PCS). Also as described above, FIG. 11 depicts the modifications needed to the AIN network of FIG. 2 in order to accommodate the use of cellular communication data with the AIN in order to carry out functions necessary to provide personal communication service. As an alternative to this combination of FIG. 13, FIG. 14 depicts a preferred embodiment of providing a parallel CCIS for a land line AIN to provide a technique whereby a wireless subscriber can directly input data to an AIN. In order to provide the desired wireless communication in the manner of either FIG. 13 or FIG. 14, the MTSO 65 connects to an STP such as STP 67 via an SS7 link.

As described in more detail in connection with FIG. 13, the system for implementing Personal Communication Service in one telephone company service area or perhaps one LATA includes a number of the SSP capable CO switches, such as the SSPs shown at 11, 13, 15 and 17 in FIG. 11. The SSP type central offices are each at a different location and distributed throughout the area of region served by the PCS system. The PCS system of one regional TelCo will connect to networks serving other regions, for example, the networks of the other TelCos. The switch 19 in FIG. 11 and the switch 52 in FIG. 13 represent one of the SSP switches of a second TelCo implementing a PCS or cellular service.

While the SSP/COs 50 and 52 are shown in FIG. 13 connected to a single STP 67 it will be understood that in practice the SSP/COs of the different TelCos will connect to a first local area STP and via one or more state or regional STPs as in illustrated in FIG. 11. The STP 67 in FIG. 13 is shown connected to an ISCP 69.

Referring to the upper right corner of FIG. 13, which in the description of this embodiment of the invention may represent the region of a second TelCo, the SSP/CO 52 is connected by land line to a MTSO 71. The MTSO in turn is connected by land line to cell sites 73 and 75 of a second cellular telephone service in the region of the second TelCo. These cell sites may communicate with a mobile station represented by the transceiver 77, handset 79, modem 81 and PC 83. The ordinary telephone terminal 58, modem 66 and PC 62 are connected by land line to the SSP/CC 52 for conventional switched telephone communication services. The TelCo subscriber may also subscribe to PCS and have a home base unit, such as shown at 85. The base unit may be the only terminal device connected to a particular telephone subscriber line or the base may connect to the line in parallel with one or more standard telephone station sets, as shown in FIG. 13 in the case of base 85.

The MTSOs 65 and 71 are connected with each other via IS-41 protocol trunks for exchange of data relating to handoff and for exchanging data for extending services to visiting subscribers of distant cellular systems who are not subscribers to PCS. The IS-41 data trunks are actually a packet switched network, which may be either an X.25 network or an SS7 network.

FIG. 14 illustrates yet another wireless embodiment of the invention. Referring to that figure there is shown a network similar to that described in connection with FIG. 13 wherein the same reference numerals are used with respect to like elements. The embodiment of FIG. 14 differs from that shown in FIG. 13 in that the MTSO 65 is provided with the switching and signaling functionality of the SSP/CO 50 in FIG. 13 and is connected to the Internet module 72 at 76. The MTSO 65 is connected to the PSTN in the conventional fashion at 54. The system in FIG. 14 is otherwise similar to that previously described in connection with FIG. 13.

A mode of operation of the system of FIG. 13 is now described in relation to the simplified flow diagrams of FIGS. 15 and 16. According to this embodiment an Internet connection is used to link a calling wireless telephone without the necessity of either party possessing or using personal or office computer equipment. The subscriber in this example uses the fixed or mobile station 56, 59, 53 to initiate an Internet call to a called party at the POTS station 58. The caller turns the equipment on and dials *82 followed by the directory number of the called party at the station 58. This signal is then triggered, as by depressing the SEND button of a cellular type telephone.

As is illustrated in FIG. 15 at 300, the calling party dials the prefix *82 followed by the directory number of the called party and presses the SEND button. The prefix *82 and directory number are transmitted from the transceiver 59 to the cell site transceiver 61. At 302 the MTSO receives the dialed digits from the calling station and cell site transceiver. At 304 the MTSO determines from the prefix *82 that the call is an Internet call and connects to the SSP/CO 50. The calling information is transferred either via the connection or the SS7 links. As previously explained the SSP/CO 50 knows that the call must be completed through a remote office and that further processing is necessary. At 306 the SSP/CO 50 suspends the call and at 308 sends a CCIS query message to the remote SSP/CO through one or more of the STPs.

The query message goes to the central office 52 to which the called station 58 is connected. The SSP/CO 52 determines whether or not the called station 58 is busy at 310. If the called station is busy, the receiving SSP/CO so informs the originating SSP/CO at 312. At 314 the originating SSP/CO provides a busy signal to the calling station 56 via the MTSO 65, cell site 61, and transceiver 59.

If the called station 58 is not busy, the receiving SSP/CO 52 busies out the called station line by blocking all calls at 316. The destination SSP/CO 52 then informs the originating SSP/CO 50 that the called line is available and waiting at 318, and that the processor in the Internet Module associated with the SSP/CO 52 is available.

An Internet virtual connection is then established between the calling and called stations at 320 as presently will be described in detail. The receiving or destination SSP/CO 52 provides a ringing signal to the called station 58 and the original MTSO 65 sends ringback tone back via the cell site 61 and transceiver 53 to the calling station 56 at 322. When the called station 58 goes off hook and the Internet virtual connection is completed the conversation via the Internet can commence.

The flow diagram in FIG. 16 illustrates one embodiment of the set up of the Internet connection according to the invention. When the originating SSP/CO 50 receives from the destination SSP/CO 52 the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two stations.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. This CCIS or SS7 communication between the originating central office and the originating Internet Module is indicated at 324 in FIG. 16. When the originating central office receives the message that the addresses have been assigned, the switching system connects the originating MTSO to the Internet Module 72. This connection is indicated at 326.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing embodiments of the initial connection steps, the Internet Module router 85 in the Internet Module 72 sends a request for the assignment of temporary IP addresses for the two directory numbers to the DHCP server 91 as indicated at 328. The DHCP server hears the message and offers an IP address for each directory number for a certain time period which may be determined by the router or the server. Upon agreement as to the time period the addresses are accepted and assigned at 330. At 332 originating Internet Module 72 triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module, the address may be obtained at the receiving central office switching system and its associated Internet Module and communicated to the originating central office switching system via the common channel signaling link.

As the conversation commences the originating Internet Module 72 is receiving from the originating central office 50 over the trunk connection digitized speech in DS0 format. The Internet Module implements the function of a packet assembler and disassembler or PAD and assembles packets in TCP/IP format. This is indicated at 334. The packets bear the source and destination IP addresses and the digitized speech payload. The packets are dispatched from the originating router 85 onto the Internet and are delivered to the destination router and Internet Module 74.

The receiving router and associated processor have the directory number of the called party and the matching IP address which were obtained via CCIS signaling from the originating router, as indicated at step 332 described hereinabove. The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal. The packet exchange is indicated in FIG. 16 at 336. The two way transfer of voice signals is indicated at 338.

A further mode of operation of the system of FIG. 13 is for a subscriber using the wireless station 56, 59, 53 to connect to a called party having PC with voice capabilities where the calling party knows the Internet domain name of the called party. This mode of operation is the same as that described for the embodiment of FIG. 4 in relation to FIG. 8 with the exception that connection is made from the SSP/CO 50 in FIG. 13 to the MTSO 65 and thence to the wireless station 56, 59, 53.

A still further embodiment of the invention comprises completing a voice call using a voice capable PC at the originating station. This embodiment is similar to that previously described in relation to FIG. 10 and is not here repeated. As in the preceding embodiment the method differs in making the connection to the wireless station 56, 59, 53, 60 via the MTSO 65.

While the foregoing examples of this embodiment of the invention have involved an Internet call to the land line connected POTS station 58, the invention also comprehends that such calls may be terminated in a wireless station 77, 79, 81, 83 or a PCS station 87, 85. In the case of the wireless station 77, 79, 81, 83, the call is terminated through the MTSO 71 and cell site 75 in the inverse manner with which the call is handled by the originating station 56, 59, 53 and MTSO 65 and cell site 61. In a still different embodiment the system may be constituted as shown in FIG. 14 wherein the MTSO 65 is directly connected to the Internet module 72 and performs the switching functionality of the SSP/CO 50 in FIG. 13. The mode of operation is similar to that described with respect to FIG. 13.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A communications network comprising:

a switched land line telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the connected central office switching system or through the connected central office switching system and at least one other central office switching system;

a separate control network for said switched telecommunications network comprising a Common Channel Interoffice Signaling (CCIS) network including Signal Transfer Points (STPs) connected to said central office switching systems through Signal Switching Points (SSPs) via links between said SSPs and STPs;

a wireless cellular communication system including cell site stations arranged for communication with wireless subscriber terminals, a Mobile Telephone Switching Office (MTSO), and cell site control entities linked to the MTSO over data links;

a first interface between said MTSO and one of said central office switching systems;

a second interface between said MTSO and said control network;

a public packet data internetwork separate from said switched telephone network and said wireless cellular communication system comprising multiple remotely spaced computer networks of varying types connecting computers of varying types, said computer networks being connected together by links including telecommunication links and using transmission control protocols for linking dissimilar computers through an internet protocol to provide addressing to provide connectionless packet service between said computers;

each of two of said central office switching systems having connected thereto an Internet module and a MTSO to provide selective connection between said modules and subscriber terminals;

each of said Internet modules including a processor;

said Internet modules being linked to STPs in said control network whereby in response to control signals a virtual connection is established from a first subscriber terminal through said internetwork to a second subscriber terminal to provide voice communication between said subscriber terminals.

2. A communications network according to claim 1 wherein at least one of said subscriber terminals is a cellular telephone.

3. A communications network according to claim 1 wherein said Internet modules provide domain name translations and provide temporary Internet addresses used in establishing said virtual connection.

4. A communications network comprising:

a switched land line telecommunications network having interconnected central office switching systems and having subscriber lines connected thereto and to subscriber terminals;

a separate control network for said switched telecommunications network comprising a Common Channel Interoffice Signaling (CCIS) network including Signal Transfer Points (STPs) connected to said central office switching systems through Signal Switching Points (SSPs) via links between said SSPs and STPS;

a wireless cellular communication system including cell site stations arranged for communication with wireless subscriber terminals, a Mobile Telephone Switching Office (MTSO), and cell site controllers linked to said MTSO over data links;

a first interface between said MTSO and one of said central office switching systems;

a second interface between said MTSO and said control network;

a public packet data internetwork separate from said switched telephone network and said wireless cellular communication system comprising multiple remotely spaced computer networks of varying types, said computer networks being connected together by links including telecommunication links and using transmission control protocols for linking dissimilar computers through an internet protocol to provide addressing to provide connectionless packet service between said computer networks;

at least a pair of said central office switching systems having connected thereto an internetwork interface and a MTSO to provide selective connection between said interfaces and said subscriber terminals;

each of said internetwork interfaces including a processor and being linked to STPs in said control network whereby in response to control signals a virtual connection is established from a first subscriber terminal through said internetwork to a second subscriber terminal to provide voice communication between said subscriber terminals.

5. A communications network according to claim 4 wherein at least one of said subscriber terminals is a cellular telephone.

6. A communications network according to claim 4 wherein said internetwork interfaces provide domain name translations and provide temporary internetwork addresses used in establishing said virtual connection.

7. A method of establishing from a wireless terminal a voice connection via the Internet comprising the steps of:

(a) transmitting from a calling wireless terminal a wireless signal identifying the call as an Internet call and identifying a called terminal, said signal having sufficient information content to establish routing the call;

(b) receiving said transmitted signal at a first switching entity and translating said signal to a Common Channel Interoffice Signaling (CCIS) protocol signal;

(c) in response to said receiving step, transmitting said CCIS protocol signal from said first switching entity via a land line CCIS network to a second switching entity;

(d) receiving said CCIS protocol signal at said second switching entity and responsive thereto determining the availability of the identified called terminal;

(e) if said called terminal is available transmitting a reply CCIS protocol signal to said first switching entity via said land line CCIS network and blocking other connections to said called terminal via said second switching entity;

(f) responsive to said reply signal establishing TCP/IP address parameters for an Internet link between said switching entities and establishing said Internet link; and (g) signaling said calling terminal that said Internet link has been established.

8. A method according to claim 7 including the steps of receiving said wireless signal from said calling terminal at a cellular base station site;

transmitting from said base station site to a Mobile Telephone Switching Office (MTSO) a signal identifying the call as an Internet call and identifying said called terminal and identifying said calling terminal;

responsive to receipt of said signal at said MTSO creating said CCIS protocol signal.

9. A method according to claim 7 wherein said address parameters are assigned for temporary use for purposes of said voice connection via the Internet.

10. A method according to claim 7 wherein both the calling and called terminals are wireless terminals.

11. A method of establishing from a subscriber terminal in a public switched telephone network (PSTN) a voice connection via the Internet comprising the steps of:

(a) transmitting from a calling subscriber PSTN terminal a signal identifying the call as an Internet call and identifying a called terminal said signal having sufficient information content to establish routing the call;

(b) receiving said transmitted signal at a first switching entity and translating said signal to a Common Channel Interoffice Signaling (CCIS) protocol signal;

(c) in response to said receiving step, transmitting said CCIS protocol signal from said first switching entity via a land line CCIS network to a second switching entity;

(d) receiving said CCIS protocol signal at said second switching entity and responsive thereto determining the availability of the identified called terminal;

(e) if said called terminal is available transmitting a reply CCIS protocol signal to said first switching entity via said land line CCIS network and blocking other connections to said called terminal via said second switching entity;

(f) responsive to said reply signal establishing TCP/IP address parameters for an Internet link between said switching entities and establishing said Internet link; and (g) signaling said calling terminal that said Internet link has been established.

12. A method according to claim 11 wherein said address parameters are assigned for temporary use for purposes of said voice connection via the Internet.

13. A method according to claim 11 wherein both the calling and called terminals are wireless terminals.

14. A method of communicating via plural communication networks comprising;

a switched land line telecommunications network having interconnected central office switching systems and having subscriber lines connected thereto and to subscriber terminals;

a separate control network for said switched telecommunications network comprising a Common Channel Interoffice Signaling (CCIS) network including Signal Transfer Points (STPs) connected to said central office switching systems through Signal Switching Points (SSPs) via links between said SSPs and STPs;

a wireless cellular communication system including cell site stations arranged for communication with wireless subscriber terminals, Mobile Telephone Switching Offices (MTSOs), and cell site controllers linked to said MTSOs over data links;

a first interface between one of said MTSOs and one of said central office switching systems;

a second interface between said one of said MTSOs and said control network;

a third interface between a second of said MTSOs and another one of said central office switching systems;

a fourth interface between said second of said MTSOs and said control network;

a public data packet internetwork separate from said switched telephone network and said wireless cellular communication system comprising multiple remotely spaced computer networks of varying types, said computer networks being connected together by links including telecommunication links and using transmission control protocols for linking dissimilar computers through an internet protocol to provide addressing to provide connectionless packet service between said computer networks;

a first internetwork interface between said one of said MTSOs and said internetwork;

a second internetwork interface between said second one of said MTSOs and said internetwork;

each of said first and second internetwork interfaces being linked to STPs in said control network;

said method comprising the steps of:

responsive to a request from a first of said wireless terminals to establish voice communication through said internetwork with a designated called second terminal, signaling through said control network to establish that said second called terminal is available;

upon establishing that said second called terminal is available, holding said second called terminal and signaling through said control network to notify said second interface that said called second terminal is available;

establishing TCP/IP address parameters for a link through said internetwork;

using said address parameters to establish a virtual connection through said internetwork from said first calling terminal to said called second terminal; and conducting a voice communication through said first calling terminal and said called second terminal.

* * * * *